(12) United States Patent
Han et al.

(10) Patent No.: US 9,479,309 B2
(45) Date of Patent: Oct. 25, 2016

(54) METHOD AND APPARATUS FOR RESOLVING THE CONFUSION IN CCES

(75) Inventors: Seung Hee Han, Anyang-si (KR); Yeong Hyeon Kwon, Anyang-si (KR); Jae Hoon Chung, Anyang-si (KR); Moon Il Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 392 days.

(21) Appl. No.: 13/578,986

(22) PCT Filed: Feb. 1, 2011

(86) PCT No.: PCT/KR2011/000714
§ 371 (c)(1),
(2), (4) Date: Sep. 27, 2012

(87) PCT Pub. No.: WO2011/099722
PCT Pub. Date: Aug. 18, 2011

(65) Prior Publication Data
US 2013/0010724 A1    Jan. 10, 2013

Related U.S. Application Data

(60) Provisional application No. 61/304,482, filed on Feb. 14, 2010, provisional application No. 61/305,543, filed on Feb. 17, 2010, provisional application No. 61/321,875, filed on Apr. 8, 2010, provisional application No. 61/333,263, filed on May 11, 2010, provisional application No. 61/356,050, filed on Jun. 18, 2010.

(30) Foreign Application Priority Data

Oct. 29, 2010 (KR) ........................ 10-2010-0106867

(51) Int. Cl.
*H04W 4/00* (2009.01)
*H04L 5/00* (2006.01)

(52) U.S. Cl.
CPC ............. *H04L 5/0053* (2013.01); *H04L 5/001* (2013.01); *H04L 5/0007* (2013.01); *H04L 5/0037* (2013.01); *H04L 5/0094* (2013.01)

(58) Field of Classification Search
None
See application file for complete search history.

(56) References Cited

U.S. PATENT DOCUMENTS 8,463,262 B2 *   6/2013   Kwon et al. .................. 455/434
2009/0088148 A1 *  4/2009   Chung et al. ................. 455/423

(Continued)

FOREIGN PATENT DOCUMENTS

| KR | 10-2009-0083269 | 8/2009 |
|---|---|---|
| WO | WO 2009/041779 | 4/2009 |
| WO | WO 2009/058905 | 5/2009 |

OTHER PUBLICATIONS

3GPP TS 36.213 version 10.1.0 Release 10: "LTE; Evolved Universal Terrestrial Radio Access (E-UTRA); Physical layer procedures", European Telecommunications Standards Institute 2011, pp. 23, 25, 84-85.*

(Continued)

*Primary Examiner* — Kevin C Harper
(74) *Attorney, Agent, or Firm* — Dentons US LLP

(57) ABSTRACT

The present invention relates to a wireless communication system. In particular, the present invention relates to a method for handling physical downlink control channels (PDCCHs) in a user equipment, the method comprising: receiving a plurality of control channel elements (CCEs) from a base station; performing blind decoding of the plurality of CCEs in CCE aggregation units; and identifying a CCE aggregation level used for the PDCCH transmission, on the basis of the blinding decoding result, wherein the CCE aggregation level is relevant resource mapping of the control information included in the PDCCH.

10 Claims, 18 Drawing Sheets

(56) References Cited

U.S. PATENT DOCUMENTS

2009/0257449 A1* 10/2009 Chen et al. .................. 370/470
2009/0274109 A1* 11/2009 Zhang et al. ................ 370/329
2010/0215011 A1* 8/2010 Pan et al. ..................... 370/329
2010/0291937 A1* 11/2010 Hu et al. ...................... 455/450
2011/0205978 A1* 8/2011 Nory et al. ................... 370/329
2012/0093104 A1* 4/2012 Tiirola et al. ................ 370/329

OTHER PUBLICATIONS

International Search Report from PCT/KR2011/000714, dated Oct. 13, 2011.

* cited by examiner (a) 1 or 2Tx case (b) 4Tx case

PUCCH format 1a and 1B structure (generally CP case)

PUCCH format 2, 2a, 2B structures (generally CP case)

(a) base station (BS)

(b) user equipment (UE)

(a) base station (BS)

(b) user equipment (UE)

METHOD AND APPARATUS FOR RESOLVING THE CONFUSION IN CCES

This Application is a 35 U.S.C. §371 National Stage Entry of International Application No. PCT/KR2011/000714, filed Feb. 1, 2011 and claims the benefit of U.S. Provisional Application Nos. 61/304,482, filed Feb. 14, 2010; 61/305,543, filed Feb. 17, 2010; 61/321,875, filed Apr. 8, 2010; 61/333,263, filed May 11, 2010; 61/356,050, filed Jun. 18, 2010; and Korean Application No: 10-2010-0106867, filed Oct. 29, 2010, all of which are incorporated by reference in their entirety herein.

TECHNICAL FIELD

The present invention relates to a wireless communication system, and more particularly to a method and apparatus for preventing control channel element (CCE) confusion.

BACKGROUND ART

Wireless communication systems have been widely used to provide various kinds of communication services such as voice or data services. Generally, a wireless communication system is a multiple access system that can communicate with multiple users by sharing available system resources (bandwidth, transmission (Tx) power, and the like). A variety of multiple access systems can be used. For example, a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency-Division Multiple Access (SC-FDMA) system, and the like.

DISCLOSURE

Technical Problem

Accordingly, the present invention is directed to a method and apparatus for preventing CCE confusion in a wireless communication system.

It will be appreciated by persons skilled in the art that the objects that can be achieved through the present invention are not limited to what has been particularly described hereinabove and the above and other objects that the present invention can achieve will be more clearly understood from the following detailed description taken in conjunction with the accompanying drawings.

Technical Solution

The object of the present invention can be achieved by providing a method for processing a physical downlink control channel (PDCCH) by a user equipment (UE) in a wireless communication system, the method including: receiving a plurality of control channel elements (CCEs) from a base station (BS); performing blind decoding of the plurality of CCEs in units of a CCE aggregation; and recognizing a CCE aggregation level used for transmission of the PDCCH on the basis of the blind decoding result, wherein a resource mapping scheme of control information contained in the PDCCH is associated with a CCE aggregation level.

A mapping start position of control information on at least one CCE used for PDCCH transmission may be associated with a CCE aggregation level.

A mapping direction of control information on at least one CCE used for PDCCH transmission may be associated with a CCE aggregation level.

The method may further include performing uplink resource allocation for an uplink transmission mode using a CCE aggregation level of the PDCCH. If the CCE aggregation level of the PDCCH is set to 1, an uplink resource for a single antenna transmission may be allocated, and if the CCE aggregation level of the PDCCH is set to 2 or higher, a plurality of uplink resources for multiple input multiple output (MIMO) transmission may be allocated. The plurality of uplink resources for the MIMO transmission may correspond to physical uplink control channel (PUCCH) resources orthogonal to each other. A first PUCCH resource may be linked to the smallest CCE index used for the PDCCH transmission, and a second PUCCH resource may be linked to a specific value obtained when an offset is added to the smallest CCE index.

In another aspect of the present invention, a user equipment (UE) configured to process a physical downlink control channel (PDCCH) in a wireless communication system includes: a radio frequency (RF) unit; and a processor, wherein the processor receives a plurality of control channel elements (CCEs) from a base station (BS), performs blind decoding of the plurality of CCEs in units of a CCE aggregation, and recognizes a CCE aggregation level used for transmission of the PDCCH on the basis of the blind decoding result, wherein a resource mapping scheme of control information contained in the PDCCH is associated with a CCE aggregation level.

A mapping start position of control information on at least one CCE used for PDCCH transmission may be associated with a CCE aggregation level.

A mapping direction of control information on at least one CCE used for PDCCH transmission may be associated with a CCE aggregation level.

The processor may be configured to perform uplink resource allocation for an uplink transmission mode using a CCE aggregation level of the PDCCH. The processor may allocate an uplink resource for a single antenna transmission if the CCE aggregation level of the PDCCH is set to 1, and may allocate a plurality of uplink resources for multiple input multiple output (MIMO) transmission if the CCE aggregation level of the PDCCH is set to 2 or higher. The plurality of uplink resources for the MIMO transmission may correspond to physical uplink control channel (PUCCH) resources orthogonal to each other. A first PUCCH resource may be linked to the smallest CCE index used for the PDCCH transmission, and a second PUCCH resource may be linked to a specific value obtained when an offset is added to the smallest CCE index.

Advantageous Effects

Exemplary embodiments of the present invention have the following effects. The embodiments of the present invention can prevent CCE confusion from occurring in a wireless communication system. It will be appreciated by persons skilled in the art that the effects that can be achieved through the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

BEST MODE

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following embodiments of the present invention can be applied to a variety of wireless access technologies, for example, CDMA, FDMA, TDMA, OFDMA, SC-FDMA, MC-FDMA, and the like. CDMA can be implemented by wireless communication technologies, such as Universal Terrestrial Radio Access (UTRA) or CDMA2000. TDMA can be implemented by wireless communication technologies, for example, a Global System for Mobile communications (GSM), a General Packet Radio Service (GPRS), an Enhanced Data rates for GSM Evolution (EDGE), etc. OFDMA can be implemented by wireless communication technologies, for example, IEEE 802.11 (Wi-Fi), IEEE 802.16 (WiMAX), IEEE 802.20, E-UTRA (Evolved UTRA), and the like. UTRA is a part of a Universal Mobile Telecommunications System (UMTS). 3rd Generation Partnership Project (3GPP) Long Term Evolution (LTE) is a part of an Evolved UMTS (E-UMTS) that uses an E-UTRA. The LTE-Advanced (LTE-A) is an evolved version of 3GPP LTE.

Although the following embodiments of the present invention will hereinafter describe inventive technical characteristics on the basis of the 3GPP LTE/LTE-A system, it should be noted that the following embodiments will be disclosed only for illustrative purposes and the scope and spirit of the present invention are not limited thereto. Specific terms used for the exemplary embodiments of the present invention are provided to aid in understanding of the present invention. These specific terms may be replaced with other terms within the scope and spirit of the present invention.

Figure 1:
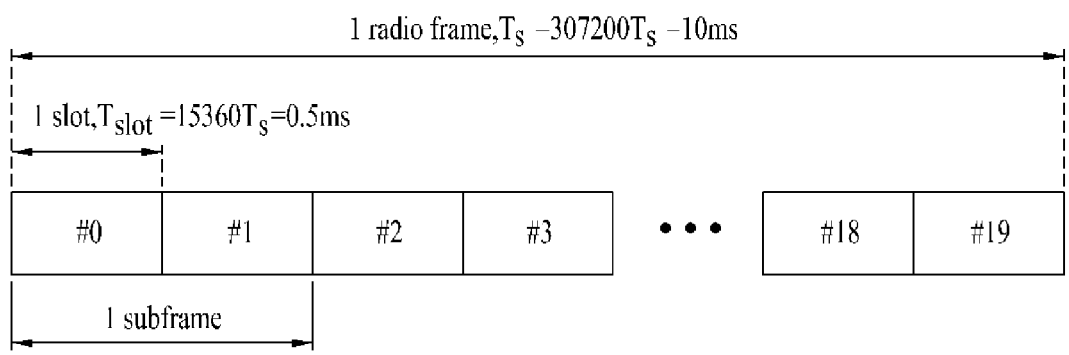
FIG. 1 exemplarily shows a radio frame structure for use in a 3rd Generation Partnership Project (3GPP) system.

FIG. 1 exemplarily shows a radio frame structure for use in a 3GPP system.

Figure 2:
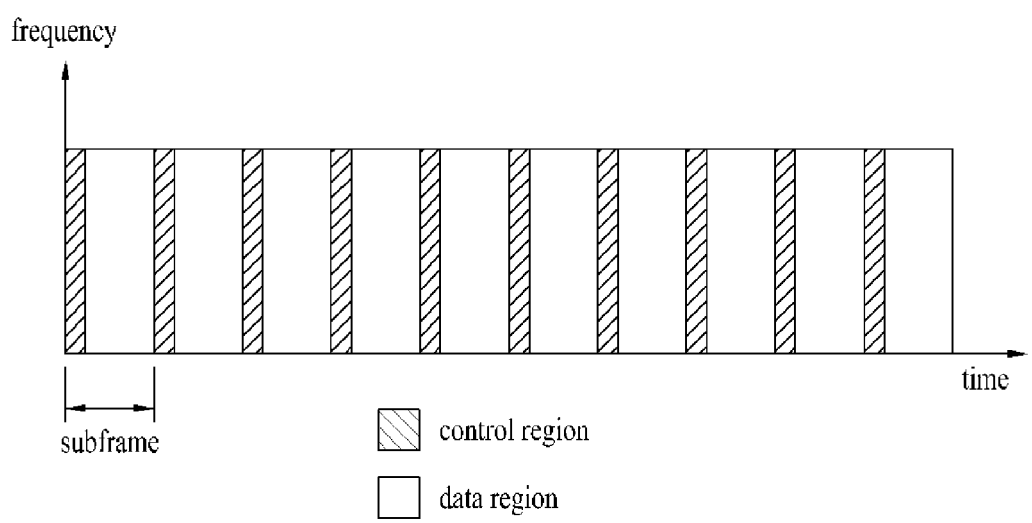
FIG. 2 is a downlink (DL) subframe structure.

Referring to FIG. 2, the radio frame has a length of 10 ms ($327200 \cdot T_s$) and includes 10 subframes of equal size. Each subframe has a length of 1 ms and includes two slots. In this case, $T_s$ represents sampling time, and is expressed by '$T_s=1/(15 \text{ kHz} \times 2048)=3.2552 \times 10^{-8}$ (about 33 ns)'. The slot includes a plurality of OFDM symbols in a time domain, and includes a plurality of resource blocks (RBs) in a frequency domain. The aforementioned structure of the radio frame is only exemplary, and various modifications can be made to the number and length of subframes contained in the radio frame or the number and length of slots contained in each subframe, or the number and length of transport symbols in each slot.

FIG. 2 is a downlink (DL) subframe structure.

Referring to FIG. 2, a downlink subframe includes a control region carrying a control channel and a data region carrying a traffic channel. The control region starts from a first OFDMA symbol of a subframe, and includes at least one OFDMA symbol. The size of the control region may be independently established for each subframe. The control channel includes a Physical Control Format Indicator CHannel (PCFICH), a Physical Hybrid-automatic repeat request (ARQ) Indicator CHannel (PHICH), a Physical Downlink Control CHannel (PDCCH), and the like. The data region includes a Physical Downlink Shared CHannel (PDSCH).

Figure 3:
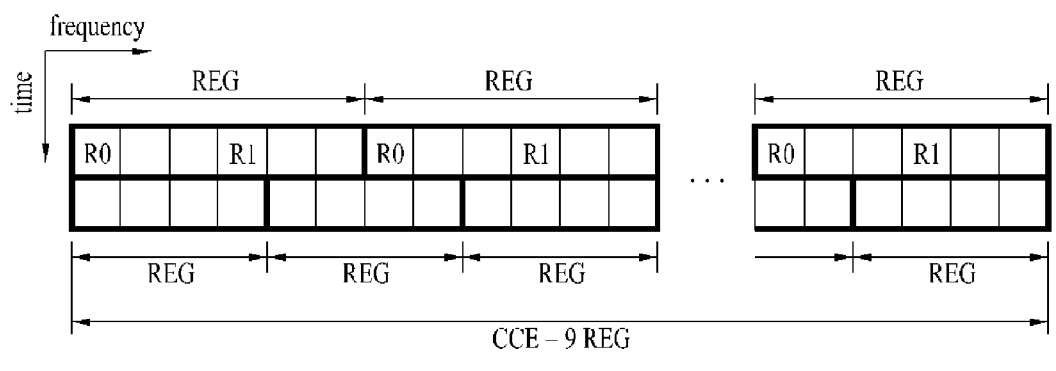
FIG. 3 is a resource unit for constructing a control region.
Figure 3:
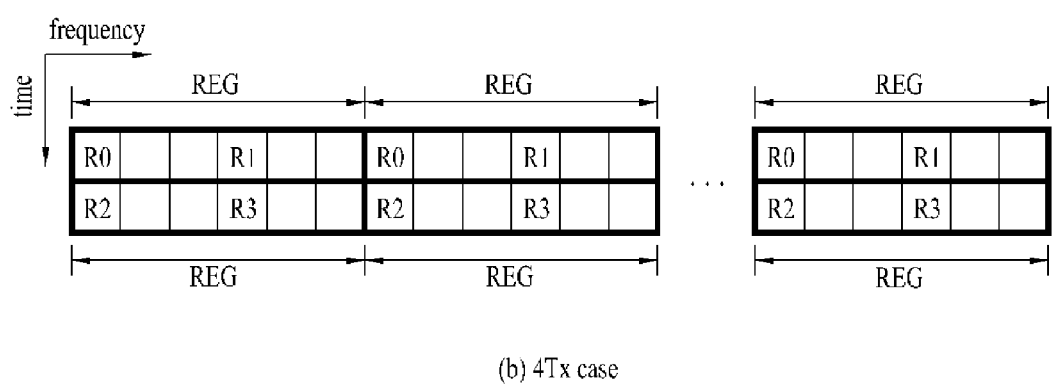

The control region for a PDCCH may include logical control channel element (CCE) sequences composed of a plurality of control channel elements (CCEs). In addition, the CCE sequence is an aggregate of all CCEs that construct the control region in a single subframe. CCE may correspond to a plurality of resource element groups (REGs). REG may be used to define a control channel mapped to a resource element (RE). The resource element (RE) includes one subcarrier and one OFDMA symbol. FIG. 3 is a resource unit for constructing a control region. Referring to FIG. 3, REG (denoted by a bold box) corresponds to 4 consecutive REs other than reference signals (R0~R3), and CCE may corresponds to 9 REs.

A plurality of PDCCHs may be transmitted in the control region. PDCCH may carry various downlink control information such as scheduling allocation. PDCCH may be transmitted to an aggregate of one or some consecutive CCEs. PDCCH format and the number of available bits of a PDCCH are determined according to the number of CCEs constructing a CCE aggregate. The number of CCEs used for PDCCH transmission may also be referred to as a CCE aggregation level. In addition, the CCE aggregation level may be a CCE unit for searching for a PDCCH. The size of the CCE aggregation level is defined as the number of contiguous CCEs. For example, the CCE aggregation level may be an element of {1, 2, 4, 8}.

Table 1 exemplarily shows a PDCCH format and the number of PDCCHs according to a CCE aggregation level.

TABLE 1

| PDCCH format | CCE aggregation level | Number of REGs | Number of PDCCHs |
|---|---|---|---|
| 0 | 1 | 9 | 72 |
| 1 | 2 | 18 | 144 |
| 2 | 4 | 36 | 288 |
| 3 | 8 | 72 | 576 |

Control information transmitted over a PDCCH is referred to as downlink control information (DCI). The DCI may include scheduling information, downlink scheduling information, system information, uplink power control command, control information for paging, and control information for indicating a RACH response.

The DCI may transmit control information for indicating activation of semi-persistent scheduling (SPS). The DCI may also transmit control information for indicating deactivation of semi-persistent scheduling. The semi-persistent scheduling may also be used for uplink or downlink Voice over Internet Protocol (VoIP).

DCI formats include format 0 for Physical Uplink Shared Channel (PUSCH), format 1 for scheduling of one Physical Downlink Shared Channel (PDSCH), format 1A for compact scheduling of one PDSCH codeword, format 1B for scheduling of rank-1 transmission of a single codeword in a spatial multiplexing mode, format 1C for very compact scheduling of Downlink Shared Channel (DL-SCH), format 1D for PDSCH scheduling in a multi-user spatial multiplexing mode, format 2 for PDSCH scheduling in a closed-loop spatial multiplexing mode, format 2A for PDSCH scheduling in an open-loop spatial multiplexing mode, and formats 3 and 3A for transmission of a Transmission Power Control (TPC) command for uplink channel.

Figure 4:
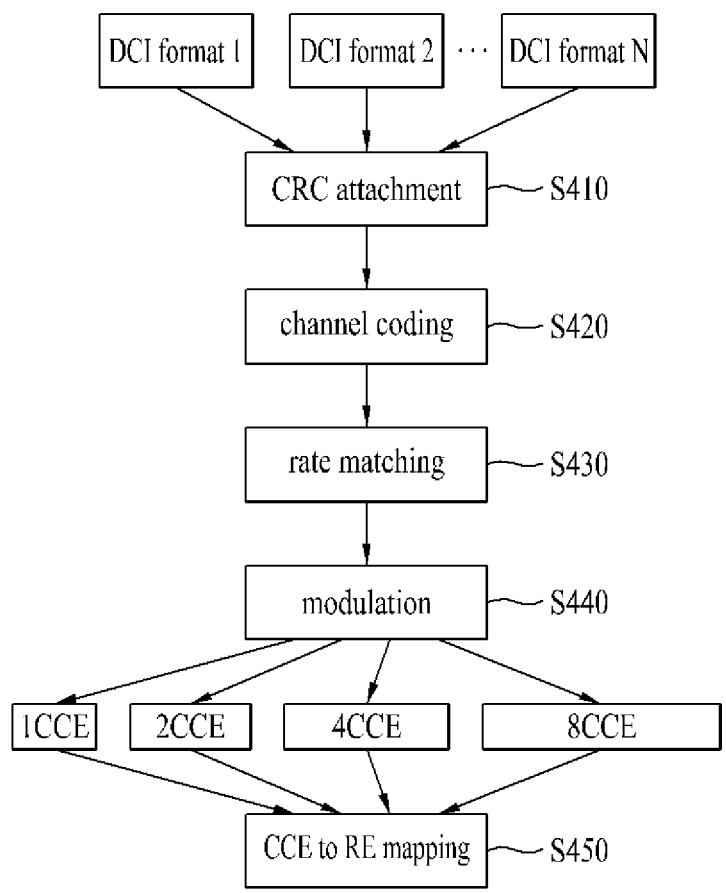
FIG. 4 is a flowchart illustrating a method for constructing a PDCCH by a base station (BS).

FIG. 4 is a flowchart illustrating a method for constructing a PDCCH by a base station (BS).

Referring to FIG. 4, a base station (BS) generates control information according to the DCI format. The base station (BS) can select one DCI format from among a plurality of DCI formats (DCI formats 1, 2, . . . , N) according to control information that is to be transmitted to a terminal. In step S410, a Cyclic Redundancy Check (CRC) for error detection is added to control information generated according to each DCI format. The CRC is masked with an identifier according to the owner or usage of the PDCCH. This ID will hereinafter be referred to as a Radio Network Temporary Identifier (RNTI).

In the case of a PDCCH for a specific terminal, the CRC may be masked with a unique identifier (for example, a cell-RNTI (C-RNTI)). That is, the CRC may be scrambled together with a unique identifier of the terminal. RNTIs for a specific terminal also include a temporary C-RNTI and a semi-persistent C-RNTI. The temporary C-RNTI may be used as a temporary identifier of the terminal during a random access procedure. The semi-persistent C-RNTI may be used to indicate activation of semi-persistent scheduling.

In the case of a PDCCH for a paging message transmitted through a PCH, a CRC may be masked with a paging identifier, for example, a paging-RNTI (P-RNTI). In the case of a PDCCH for system information transmitted through a DL-SCH, a CRC may be masked with a system information identifier, for example, a System Information-RNTI (SI-RNTI). In the case of a PDCCH for indicating a random access response which is a response to a random access preamble transmitted by the terminal, a CRC may be masked with a Random Access RNTI (RA-RNTI).

The following table 2 illustrates an example of identifiers masked in the PDCCH.

TABLE 2

| Type | Identifier | Description |
|---|---|---|
| UE-specific | C-RNTI, Temporary C-RNTI, Semi-persistent C-RNTI | Used for a unique UE identification |
| Common | P-RNTI | Used for paging message |
|  | SI-RNTI | Used for system information |
|  | RA-RNTI | Used for random access response |

When a C-RNTI, a temporary C-RNTI, or a semi-persistent C-RNTI is used, the PDCCH carries control information for the corresponding specific terminal and, when a different RNTI is used, the PDCCH carries common control information that are received by all UEs in the cell. In step S420, channel coding is performed on the control information to which the CRC has been added to generate coded data, thereby generating coded data. In step S430, rate matching is performed according to a CCE aggregation level allocated to the PDCCH format. In step S440, the coded data is modulated to generate modulation symbols. The CCE aggregation level of the modulation symbols that constitute one PDCCH may be one of 1, 2, 4, and 8. In step S450, the modulation symbols are mapped to physical resource elements (REs) (i.e., CCE to RE mapping).

Figure 5:
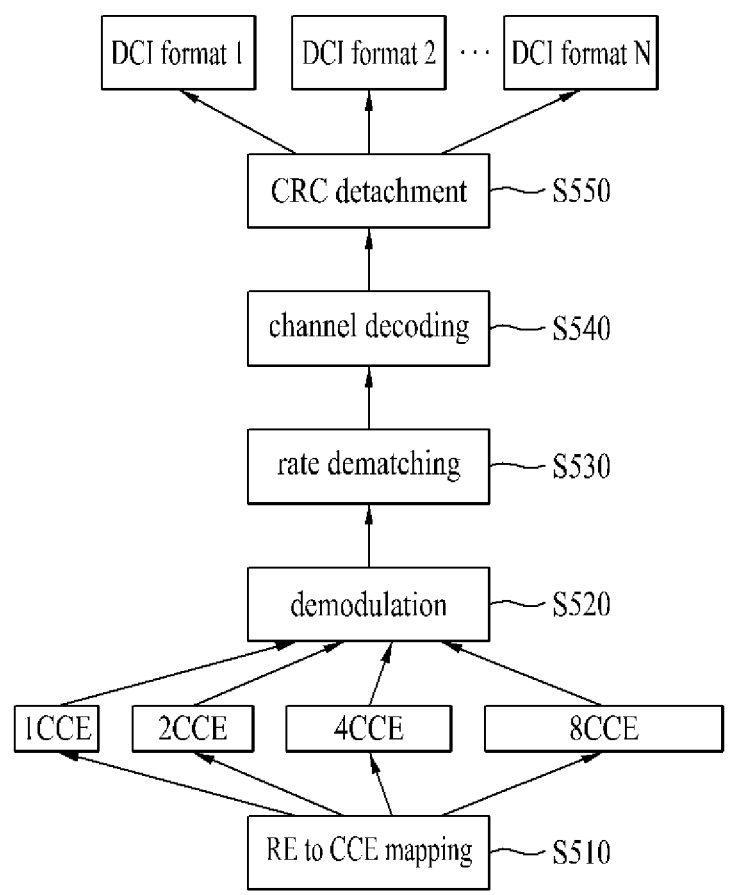
FIG. 5 is a flowchart illustrating a method for processing a PDCCH by a user equipment (UE).

FIG. 5 is a flowchart illustrating a method for processing a PDCCH by a UE.

Referring to FIG. 5, in step S510, a UE demaps physical REs to CCEs (CCE to RE demapping). In step S220, the UE demodulates each CCE aggregation level since the UE does not know a CCE aggregation level at which the UE should receive the PDCCH. In step S530, the UE performs rate dematching on the modulated data. The UE performs rate dematching for each DCI format since the UE does not know a DCI format of control information which the UE should receive. In step S540, the terminal performs channel decoding on the rate-dematched data according to the code rate and checks the CRC to determine whether or not an error has occurred. If an error has not occurred, this indicates that the UE has detected its own PDCCH. If an error has occurred, the UE continues to perform blind decoding on a different CCE aggregation level or a different DCI format. In step S550, the UE which has detected its own PDCCH removes the CRC from the decoded data, and acquires control information.

A plurality of PDCCHs for a plurality of UEs may be transmitted within a control region of one subframe. In the control region allocated within the subframe, the base station (BS) does not provide the UE with information indicating where a corresponding PDCCH is located. Therefore, the UE searches for its own PDCCH by monitoring an aggregate of candidate PDCCHs within the subframe. Here, the term "monitoring" refers to a process in which the UE attempts to decode received PDCHs according to each DCI format. This is referred to as blind detection. Through blind detection, the UE simultaneously performs identification of a PDCCH transmitted to the UE and decoding of control information transmitted through the corresponding PDCCH. For example, if no CRC error has been detected by demasking its own C-RNTI in the PDCCH, the UE determines that the PDCCH is its own PDCCH.

In order to efficiently reduce overhead of blind decoding, the number of DCI formats transmitted through a PDCCH is defined to be smaller than the number of different types of control information transmitted using the PDCCH. The DCI format includes a plurality of different information fields. The types of information fields that constitute the DCI format, the number of information fields, the number of bits of each information field, and the like vary depending on the DCI format. In addition, the size of control information that is matched to (or aligned with) the DCI format varies according to the DCI format. An arbitrary DCI format may be used to transmit two or more different types of control information. Accordingly, when control information is concretized (or specified) as a DCI format, some of the information fields may be unnecessary. That is, a specific value may not be defined in some of the information fields that constitute the DCI format. Therefore, some information fields of the DCI format may be defined as reserved fields which are reserved with an arbitrary value. The purpose of this is to adapt the size of different types of control information to a single DCI format. However, when a reserved field is present in association with control information transmission, the base station (BS) inefficiently consumes transmission energy and transmission power in order to transmit the reserved field which is not used for any functions. Accordingly, there is a need to provide a method in which it is possible to use an information field that is not used from among a plurality of information fields that constitute a DCI format.

Figure 6:
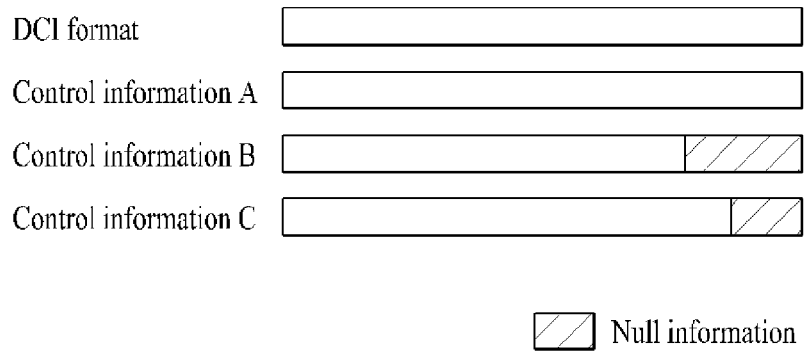
FIG. 6 is a conceptual diagram illustrating a method for utilizing an unused information field from among a plurality of information fields constructing a DCI format.

FIG. 6 is a conceptual diagram illustrating a method for utilizing an unused information field from among a plurality of information fields constructing a DCI format.

Referring to FIG. 6, different types of control information A, B, and C are grouped to use one DCI format. The different types of control information A, B, and C are matched to one DCI format. The DCI format includes a plurality of different information fields. The control information A is concretized by assigning a specific value to all information fields of the DCI format. The control information B or C is concretized by assigning a specific value to some of the information fields of the DCI format. The information bit size of the control information A is the largest in the group since the control information A meaningfully configures all information fields of the DCI format. The information bit size of the control information A serves as a reference information bit size. Null information is added to the control information B or C to make the information bit size of the control information B or C equal to the reference information bit size. This allows the information bit sizes of all control information items in the group to be fixed to the same information bit size.

In this manner, a plurality of types of different control information items are grouped to be matched to one arbitrarily designated DCI format. Each individual control information item is concretized (or specified) by mapping a specific value to information fields that constitute the corresponding DCI format. Arbitrary control information items may be concretized by assigning a specific value to all information fields of the corresponding DCI format. On the other hand, other control information items in the group may be concretized by assigning a specific value to some of the information fields of the corresponding DCI format. That is, other information fields of the DCI format need not be used to specify the control information. Here, the total size of information fields used to specify the control information may be defined as the information bit size. The information bit size of the control information of the former is the largest and the information bit size of the control information of the latter is relatively small.

The information bit size of the case in which the control information is concretized by assigning a specific value to all information fields of the DCI format is referred to as a reference information bit size. The reference information bit size is the total size of the information fields that constitute the DCI format and/or the size of the DCI format. When other control information items in the group have an information bit size smaller than the reference information bit size, null information is added to the control information items to make the information bit size of the control information items equal to the reference information bit size. That is, when specific control information is concretized by assigning a value to some of the information fields that are defined in the DCI format, remaining information fields to which no value is assigned are used as null information.

The null information is information that is added to control information to make the information bit size of the control information equal to the reference information bit size. When control information is generated according to the DCI format, some information fields that are not used may be used as null information. The null information has a specific value. For example, all information fields which are used as null information may be designated as a bit value of '0s' or a bit value of '1s'. A field that is used as null information may be designated as a value of a binary code sequence that is known to both the base station (BS) and the user equipment (BS). Such a binary code sequence may be referred to as a binary scramble code sequence. For example, such a binary code sequence may be generated based on a binary bit sequence that is known to both the base station (BS) and the UE or based on a gold sequence or an m-sequence that the base station (BS) and the UE generate through the same input parameters.

An information field that is used as null information may be preset between the base station (BS) and the user equipment (UE) or the base station (BS) may notify the UE of information associated with the information field used as null information. For example, the base station (BS) may notify the UE of information regarding the information field that is used as null information through RRC signaling or system information.

The UE may erroneously determine that a PDCCH of another UE is its own PDCCH when monitoring the PDCCH through CRC error detection or may erroneously determine that detecting has been correctly performed without CRC error detection when demasking an RNTI different from an actual RNTI. This is referred to a false positive error. In order to reduce the probability of occurrence of such a false positive error, null information may be used as a probe for additional error check or virtual CRC. That is, null information may be used as an error check field.

The following Table 3 illustrates an example of control information transmitted through the DCI format 0.

TABLE 3

| Information Field | bit(s) |
| --- | --- |
| (1) Flag for format0/format1A differentiation | 1 |
| (2) Hopping flag | 1 |
| (3) Resource block assignment and hopping resource Allocation | $\lceil \log_2(N_{RB}^{UL}(N_{RB}^{UL}+1)/2) \rceil$ |
| (4) Modulation and coding scheme and redundancy Version | 5 |
| (5) New data indicator | 1 |
| (6) TPC command for scheduled PUSCH | 2 |
| (7) Cyclic shift for DM RS | 3 |
| (8) UL index (TDD) | 2 |
| (9) CQI request | 1 |

DCI format 0 includes a plurality of information fields. The information fields include a flag field (1), a hopping flag field (2), a resource block assignment and hopping resource allocation field (3), a Modulation and Coding Scheme (MCS) and redundancy version field (4), a new data indicator field (5), a TPC command field (6), a cyclic shift field (7), a UL index field (8), and a CQI request field (9). The illustrated bit size of each information field is purely exemplary without the intention to limit the bit size of the field.

The flag field is an information field for discriminating between format 0 and format 1A. The bit size of the resource block assignment and hopping resource allocation field may vary according to a hopping PUSCH or a non-hopping PUSCH. The resource block assignment and hopping resource allocation field for the non-hopping PUSCH provides $\lceil \log_2(N_{RB}^{UL}(N_{RB}^{UL}+1)/2) \rceil$ bits for resource allocation of the first slot in an uplink subframe. Here, $N_{RB}^{UL}$ is the number of resource blocks included in the uplink slot and depends on an uplink transmission bandwidth set in the cell. The resource block assignment and hopping resource allocation field for the hopping PUSCH provides $\lceil \log_2(N_{RB}^{UL}(N_{RB}^{UL}+1)/2) \rceil - N_{UL\_hop}$ bits for resource allocation of the first slot in the uplink subframe.

The control information of PDSCH allocation is represented using all fields described above. Accordingly, the DCI format 1A for PDSCH allocation serves as control information having a reference information size (e.g., 38 bits). Therefore, when the number of information bits of the format 0 is less than the number of information bits of the format 1A, '0' is appended to the format 0 until the payload size of the format 0 becomes equal to the payload size of the format 1A. The padding field of DCI format is filled with the appended '0'.

Figure 7:
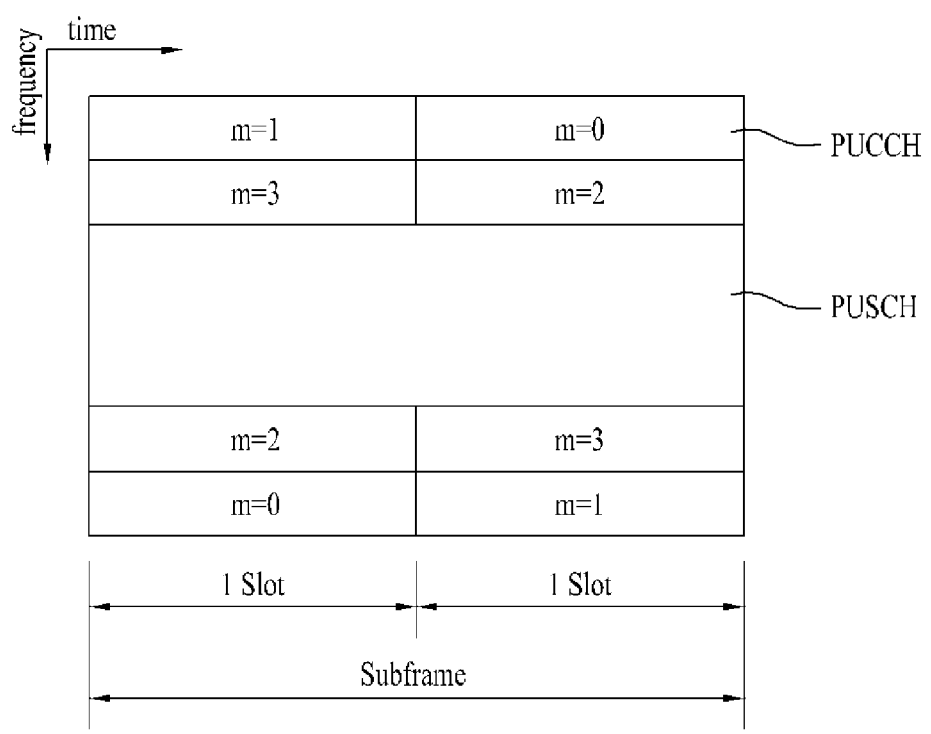
FIG. 7 is an uplink (UL) subframe structure for use in LTE.

FIG. 7 is an uplink (UL) subframe structure for use in LTE.

Referring to FIG. 7, the uplink subframe includes a plurality of slots (e.g., two). The number of SC-FDMA symbols included in one slot may be changed according to the length of a CP. For example, in the case of the normal CP, the slot may include seven SC-FDMA symbols. The uplink subframe is divided into a data region and a control region in a frequency domain. The data region includes a PUSCH and is used to transmit a data signal such as voice data. The control region includes a PUCCH and is used to transmit control information. The PUCCH includes RB pairs (e.g., m=0, 1, 2, 3) located at both ends of the data region on a frequency axis and hops between slots. The control information includes HARQ ACK/NACK, channel quality information (CQI), precoding matrix indicator (PMI), rank indication (RI), etc.

Figure 8:
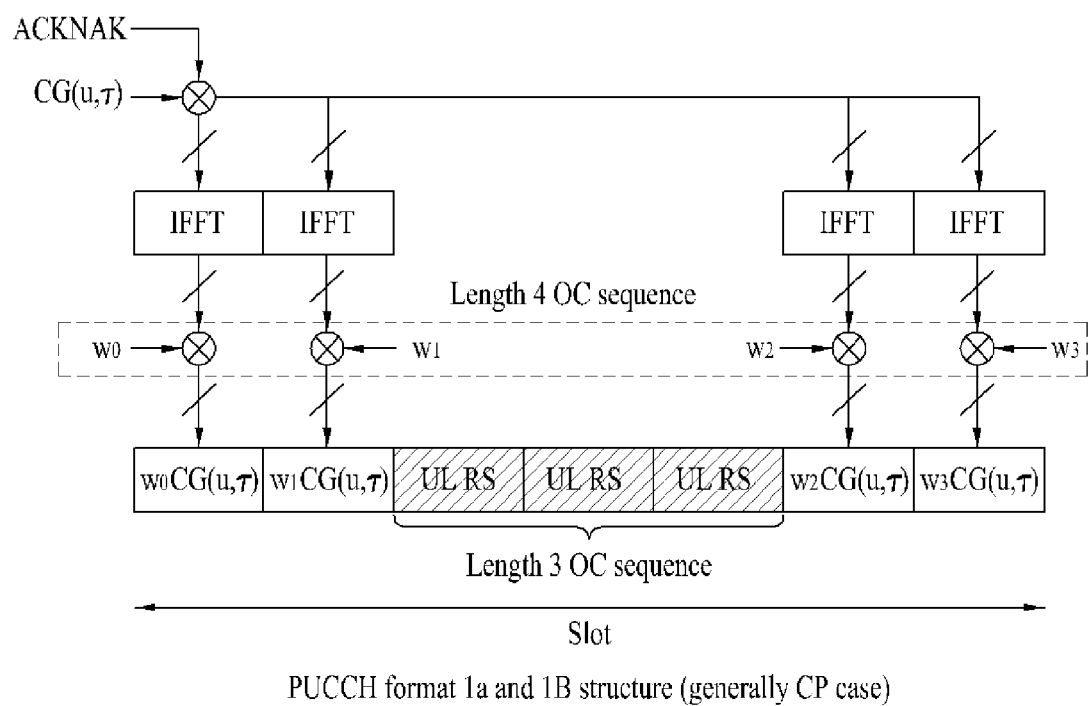
FIGS. 8 and 9 exemplarily illustrate a channel structure for a PUCCH format.
Figure 9:
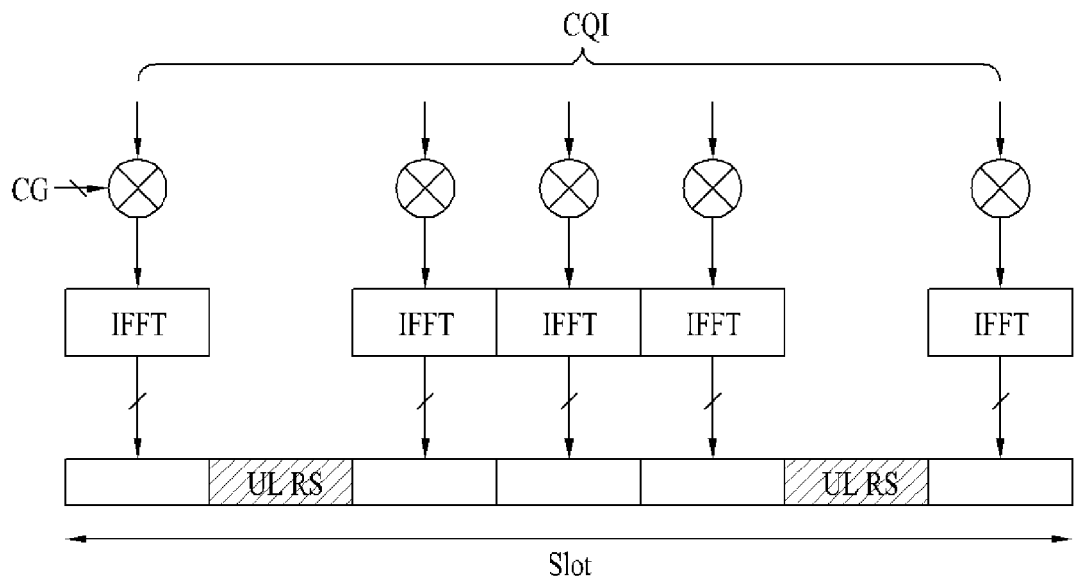

FIGS. 8 and 9 exemplarily illustrate a channel structure for a PUCCH format.

FIG. 8 exemplarily shows a PUCCH format 1a/1b structure for use in ACK/NACK transmission. Referring to FIG. 8, ACK/NACK signals of different UEs are multiplexed to one PUCCH resource using a Code Division Multiplexing (CDM) scheme. The CDM scheme is implemented using a Cyclic Shift (CS) of a sequence for frequency spread and/or a (quasi) orthogonal spreading code for time spread. For example, ACK/NACK signals in PUCCH are distinguished from each other using different CSs (frequency spread) of a Computer Generated Constant Amplitude Zero Auto Correlation (CG-CAZAC) sequence and different orthogonal cover (OC) sequences (w0~w3). Even if w0, w1, w2, and w3 multiplied after IFFT are multiplied before the IFFT, the same result is obtained. The resource index (n_r) for PUCCH format 1 is a combination of a cyclic shift index (n_cs), an orthogonal cover sequence index (n_oc), and a physical resource block index (n_PRB).

FIG. 9 shows a PUCCH 2/2a/2b structure for use in CQI transmission. Referring to FIG. 9, CQIs of different UEs are multiplexed to one PUCCH resource using a CDM scheme. For example, multiple CQIs in PUCCH are distinguished from each other using CSs of CG-CAZAC sequences. The resource index (n_r) for PUCCH format 2 is a combination of a cyclic shift index (n_cs) and a physical resource block index (n_PRB).

Figure 10:
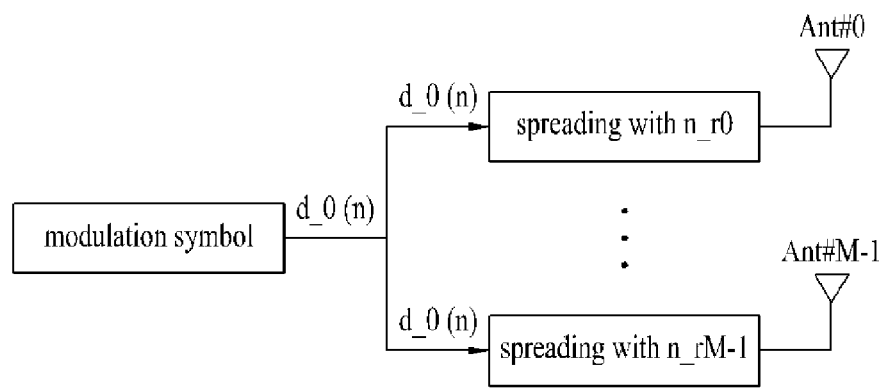
FIG. 10 is a conceptual diagram illustrating a Spatial Orthogonal Resource Transmit Diversity (SORTD) scheme for use in an uplink multiple input multiple output (MIMO).

FIG. 10 is a conceptual diagram illustrating a Spatial Orthogonal Resource Transmit Diversity (SORTD) scheme for use in an uplink multiple input multiple output (MIMO). SORTD may be used as a transmit diversity scheme for PUCCH.

Referring to FIG. 10, the UE transmits the same modulation symbol (d_0(n)) through different PUCCH orthogonal resources (n_r0~n_rM−1) of individual antennas (Ant#0~Ant#M−1). PUCCH orthogonal resources include at least one of a cyclic shift (n_cs), an orthogonal cover (n_oc), and a frequency resource block (n_PRB). PUCCH resources (CS, OC, PRB) of modulation symbols transmitted through individual antennas are orthogonal to each other, so that a high diversity gain can be obtained and at the same time orthogonality between UEs can be guaranteed. This embodiment exemplarily shows that the modulation symbol (d_0(n)) is spread using different sequences of individual antennas in a frequency domain or a time domain.

Figure 11:
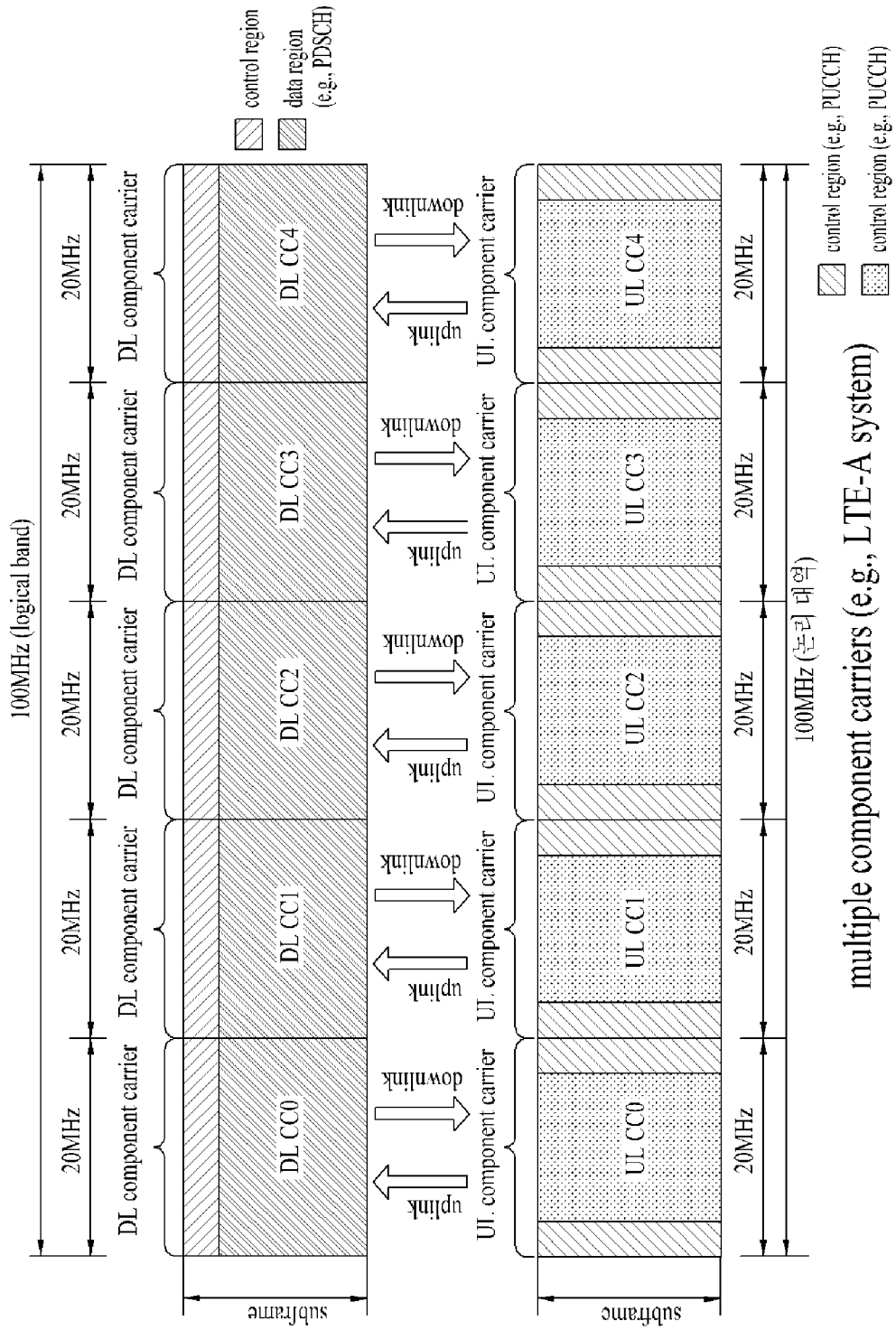
FIG. 11 is a conceptual diagram illustrating a carrier aggregation (CA) communication system.

FIG. 11 is a conceptual diagram illustrating a carrier aggregation (CA) communication system.

Referring to FIG. 11, a plurality of UL/DL CCs can be aggregated to support a wider UL/DL bandwidth. The CCs may be contiguous or non-contiguous in the frequency domain. Bandwidths of the CCs can be independently determined. Asymmetrical CA in which the number of UL CCs is different from the number of DL CCs can be implemented. On the other hand, control information may be transmitted/received only through a specific CC. This specific CC may be referred to as a Primary CC (or primary cell) and other CCs may be referred to as Secondary CCs (or secondary cells). For example, in the case of using cross-carrier scheduling, a PDCCH for downlink allocation may be transmitted to DL CC#0, and the corresponding PDSCH may be transmitted to DL CC#2. In this case, PDCCH may include a carrier indication field (CIF) for indicating a DL CC through which PDSCH is transmitted. The CIF field may include 3 bits.

Figure 12:
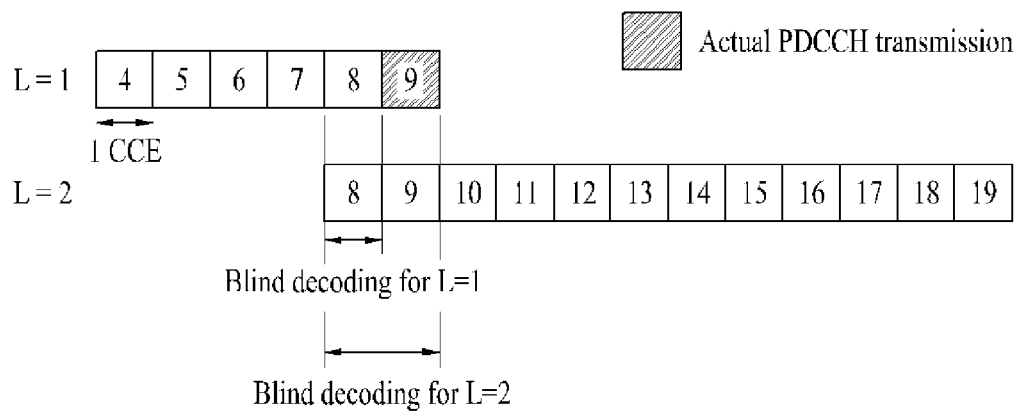
FIGS. 12 and 13 exemplarily show CCE confusion.
Figure 13:
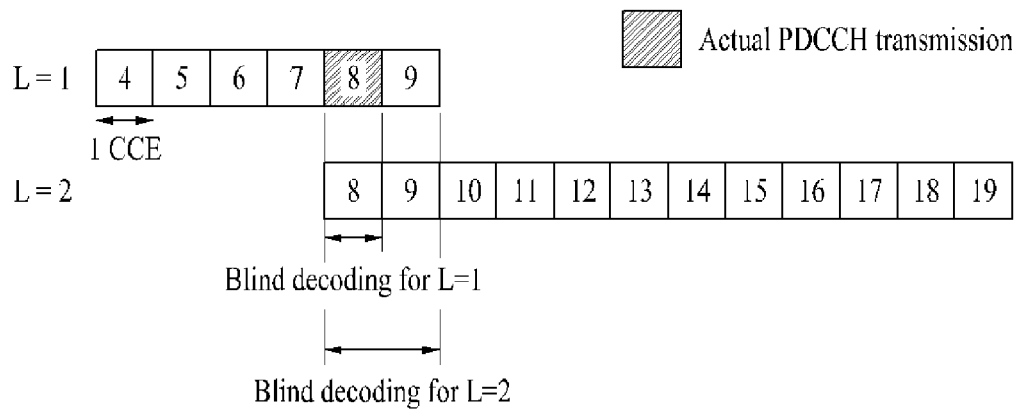

FIGS. 12 and 13 exemplarily show CCE confusion. If the information bit size satisfies the condition "m=N*k/24" (where N is the ambiguous payload size satisfying N≤54*

(8−m), where m and k are both integers.), the CCE ambiguity occurs due to attributes of the circular buffer based rate matching. For convenience of description, PUCCH resources for ACK/NACK transmission are dynamically linked to a specific CCE index of a PDCCH for downlink allocation. PUCCH resource index may be given by $n_{PUCCH}^{(1)} = n_{CCE} + N_{PUCCH}^{(1)}$. In this case, $n^{(1)}_{PUCCH}$ is a PUCCH resource index for ACK/NACK transmission, $n^{(1)}$ PUCCH is a higher-layer signaling value, and $n_{CCE}$ is the lowest value from among CCE index(es) used for PDCCH transmission.

Referring to FIG. 12, if the payload information size for PDSCH allocation satisfies the above-mentioned condition, due to circular buffer rate matching characteristics of the payload information size, blind decoding of "L (CCE aggregation level)=1" has been successfully detected at a CCE index 9 and at the same time blind decoding of L=2 can also be successfully detected at a CCE index 8 or 9. In this case, it is unclear whether to transmit ACK/NACK signals using PUCCH resources linked to any one of a CCE index 8 and a CCE index 9.

Referring to FIG. 13, in order to solve the above-mentioned problem, one or more zero bits are inserted into information bits (the number of bits other than CRC 16 bits) of ambiguous sizes in LTE system, such that ambiguity is eliminated. The ambiguous sizes are {12, 14, 16, 20, 24, 26, 32, 44, 56}. However, the CCE aggregation confusion problem may still occur under the zero-padded solution. A detailed description of the above-mentioned operation is as follows. In this case, confusion occurs not only in the ambiguous sizes but also in the arbitrary payload information sizes. However, from the viewpoint of PUCCH resource allocation, although data has been successfully decoded at L=1 and L=2, the lowest CCE index is set to 8 in each of L=1 and L=2, such that no confusion occurs in PUCCH resources. That is, although CCE confusion occurs, no problem occurs in the LTE system (i.e., 3GPP Rel-8 system).

However, if CCE-related operations (for example, resource allocation, transmission mode, etc.) are linked either to the remaining CCE indexes other than the lowest CCE index or to a CCE aggregation level, CCE confusion shown in FIGS. 12 and 13 may encounter unexpected problems in UE operations.

A method for solving CCE confusion according to the embodiments of the present invention will hereinafter be described with reference to the appended drawings. In more detail, the present invention provides a method for solving the CCE aggregation level confusion problem encountered when the starting points of the candidates of individual CCE aggregation levels of the PDCCH search space are overlapped with each other.

First, a PDCCH transmission chain will hereinafter be described. Bit blocks $b^{(i)}(0), \ldots, b^{(i)}(M_{bit}^{(i)}-1)$ to be transmitted through individual control channels in a subframe are multiplexed to bit blocks $b^{(0)}(0), \ldots, b^{(0)}(M_{bit}^{(0)}-1), b^{(1)}(0), \ldots, b^{(1)}(M_{bit}^{(1)}-1), \ldots, b^{(nPDCCH-1)}(0), \ldots, b^{(nPDCCH-1)}(M_{bit}^{(nPDCCH-1)}-1)$. In this case, $M_{bit}^{(i)}$ bit is the number of bits to be transmitted at a PDCCH number (i), and $n_{PDCCH}$ is the number of PDCCHs transmitted in the subframe.

Prior to modulation, bit blocks $b^{(0)}(0), \ldots, b^{(0)}(M_{bit}^{(0)}-1), b^{(1)}(0), \ldots, b^{(1)}(M_{bit}^{(1)}-1), \ldots, b^{(nPDCCH-1)}(0), \ldots, b^{(nPDCCH-1)}(M_{bit}^{(nPDCCH-1)}-1)$ are scrambled to scrambled bit blocks $\tilde{b}(0), \ldots, \tilde{b}(M_{tot}-1)$ using a cell-specific sequence. For example, such scrambling may be performed using $\tilde{b}(i)=(b(i)+c(i))\mod 2$. In this case, 'mod' denotes a modulo operation, c(i) is a cell-specific scramble sequence, and may be generated using $c_{init}=\lfloor n_s/2 \rfloor 2^9 + N_{ID}^{cell}$ as an initial value. In this case, $n_s$ is a slot index, and $N^{cell}_{ID}$ is a cell ID.

CCE number (n) corresponds to bit blocks b(72n), b(72n+1), ..., b(72n+71) If necessary, null values can be inserted into the bit block prior to scrambling to ensure that PDCCHs start at the CCE positions and to ensure that the length $M_{tot}=8N_{REG} \geq \Sigma_{i+0}^{nPDCCH-1} M_{bit}^{(i)}$ of the scrambled bit blocks matches the amount of REGs not assigned to PCFICH or PHICH.

Embodiment 1

Change of the Mapping Scheme Depending on CCE Aggregation Level

Embodiment 1 discloses a method for changing the CCE mapping scheme according to a CCE aggregation level. That is, the CCE mapping scheme shown in Embodiment 1 can solve the CCE confusion problem by applying different mapping to individual CCE aggregates. Embodiment 1 may be applied in any one of the information bit level before channel coding, the encoded bit level after channel coding, a bit level after rate matching, a symbol level after modulation (e.g., QPSK), a quadruplet level (or REG level) in units of 4QPSK symbol, or a subcarrier level after CCE interleaving.

Figure 14:
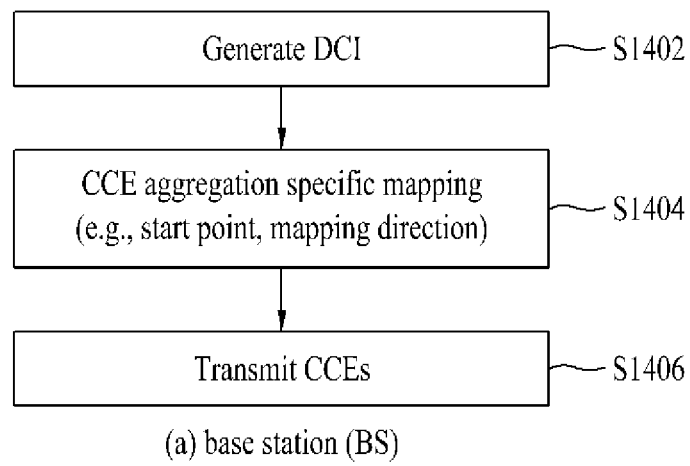
FIG. 14 is a flowchart illustrating a method for processing signals by a base station (BS) and a user equipment (BS) according to one embodiment of the present invention.
Figure 14:
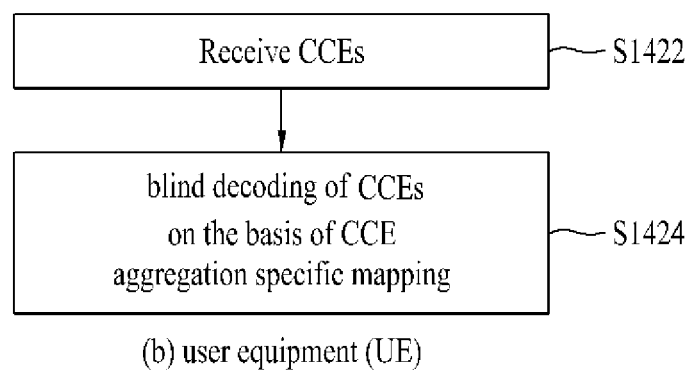

FIG. 14 is a flowchart illustrating a method for processing signals by a base station (BS) and a user equipment (BS) according to one embodiment of the present invention.

Referring to FIG. 14, the base station (BS) generates DCI information at step S1402. DCI information may be generated according to the method shown in FIG. 4. The base station (BS) maps DCI information to CCE(s) using a given mapping scheme for each CCE aggregation level at step S1404. Therefore, the BS transmits the CCE(s) to the UE at step S1406. The CCE aggregation specific mapping scheme means that the mapping starting position (e.g., offset), the mapping direction and the like are configured in different ways according to individual CCEs. For example, different circular offsets may be configured according to a CCE aggregation level (L) so that CCE mapping can be achieved. For convenience of description, it is assumed that the number of bits after rate matching corresponding to one CCE is 72, and it is also assumed that this embodiment is applied to bits corresponding to 72 bits after rate matching. The offsets 0, 72/4, 72/4*2, and 72/4*3 may be set to L=1, L=2, L=3, and L=8, respectively. The following Equation 1 shows an example of CCE mapping.

$$L=1: b^{(nPDCCH)}(0), \ldots, b^{(nPDCCH)}(71)$$

$$L=2: b^{(nPDCCH)}(18), \ldots, b^{(nPDCCH)}(143), b^{(nPDCCH)}(0), \ldots, b^{(nPDCCH)}(17)$$

$$L=4: b^{(nPDCCH)}(36), \ldots, b^{(nPDCCH)}(287), b^{(nPDCCH)}(0), \ldots, b^{(nPDCCH)}(35)$$

$$L=8: b^{(nPDCCH)}(54), \ldots, b^{(nPDCCH)}(575), b^{(nPDCCH)}(0), \ldots, b^{(nPDCCH)}(53) \quad \text{[Equation 1]}$$

On the other hand, if the number of UE operations needed depending on CCE detection is a small number (e.g., 2), the UE need not discriminate CCE aggregation levels of all cases. In this case, it is necessary for the UE to determine whether a CCE aggregation level of a PDCCH is set to specific value (e.g., CCE aggregation level 1). In this case, if data is transmitted at L=1, the starting offset may be determined to be 0 at L=1. If data is transmitted at the starting offsets L=2, 4, 8, data can be transmitted at the offset of 72/2(=36). Equation 2 shows an example of CCE mapping.

$$L=1: b^{(nPDCCH)}(0), \ldots, b^{(nPDCCH)}(71)$$

$$L=2,3,4: b^{(nPDCCH)}(36), \ldots, b^{(nPDCCH)}(287), \ldots, b^{(nPDCCH)}(0), \ldots, b^{(nPDCCH)}(35) \quad \text{[Equation 2]}$$

On the other hand, the mapping direction may be changed for each CCE aggregation level. For example, in the case of L=1, data is transmitted without change. In the case of L=2, 4, 8, reverse mapping can be performed. Equations 3 and 4 show the mapping examples when the mapping direction is changed.

$$L=1: b^{(nPDCCH)}(0), \ldots, b^{(nPDCCH)}(71)$$

$$L=2: b^{(nPDCCH)}(143), \ldots, b^{(nPDCCH)}(0)$$

$$L=4: b^{(nPDCCH)}(287), \ldots, b^{(nPDCCH)}(0)$$

$$L=8: b^{(nPDCCH)}(575), \ldots, b^{(nPDCCH)}(0) \quad \text{[Equation 3]}$$

$$L=1: b^{(nPDCCH)}(71), \ldots, b^{(nPDCCH)}(0)$$

$$L=2: b^{(nPDCCH)}(0), \ldots, b^{(nPDCCH)}(143)$$

$$L=4: b^{(nPDCCH)}(0), \ldots, b^{(nPDCCH)}(287)$$

$$L=8: b^{(nPDCCH)}(0), \ldots, b^{(nPDCCH)}(575) \quad \text{[Equation 4]}$$

For convenience of description, although one case in which the mapping starting position (e.g., offset) is changed and the other case in which the mapping direction is changed are disclosed separately from each other, it should be noted that a combination of the two cases may also be used without any problems.

UE signal processing is performed in reverse order of BS signal processing. That is, after the UE receives CCEs from the BS at step S1422, the UE performs blind decoding the CCEs using the CCE aggregation specific mapping scheme. Blind decoding may be carried out using the method shown in FIG. 5.

Figure 15:
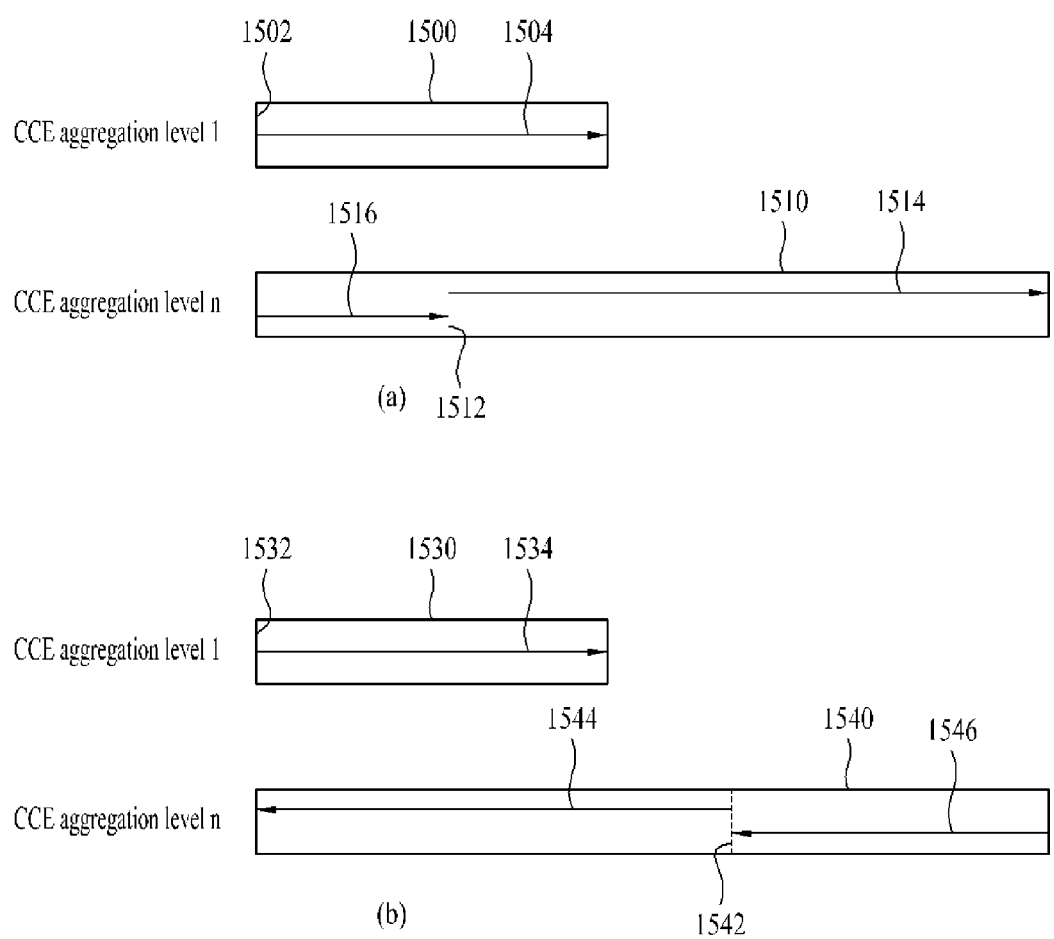
FIG. 15 shows an example of CCE mapping according to one embodiment of the present invention.

FIG. 15 shows an example of CCE mapping according to one embodiment of the present invention. Referring to FIG. 15(a), if a CCE aggregation level is set to 1, DCI 1504 starts from the first point 1502 of one CCE 1500 and is then mapped in a forward direction. On the other hand, if the CCE aggregation level is not set to 1, DCIs 1514 and 1516 start from the circular offset 1512 on multiple CCEs 1510, and are mapped in a forward direction. Referring to FIG. 15(b), if a CCE aggregation level is set to 1, DCI 1534 starts from the first position 1532 of one CCE 1530, and is mapped in a forward direction. On the other hand, if the CCE aggregation level is not set to 1, DCIs 1544 and 1546 start from the position designated by the circular offset 1512 on multiple CCEs 1540, and are mapped in a reverse direction. Although FIG. 15 exemplarily shows that forward mapping is performed when the CCE aggregation level is set to 1 and reverse mapping is performed in the remaining CCE aggregation levels other than 'CCE aggregation level=1', it should be noted that the forward mapping may also be performed in the remaining CCE aggregation levels and the reverse mapping may also be performed at 'CCE aggregation level=1' as needed. In more detail, if the CCE aggregation level is set to 1, reverse mapping is performed. And forward mapping may be performed in the remaining CCE aggregation levels (See Equation 4).

Embodiment 2

Scrambling Depending on CCE Aggregation Level

Embodiment 2 shows a method for performing scrambling according to a CCE aggregation level. That is, the scrambling pattern is defined according to the CCE aggregation level, thus when information is transmitted on a specific CCE(s), the information is transmitted using the predefined scrambling pattern. In the present invention, the scrambling may include interleaving or permutation unless otherwise mentioned. When a PDCCH is masked with a sequence (e.g., C-RNTI) corresponding to a UE ID, scrambling may be applied also to the UE ID or not applied to the UE ID. Embodiment 2 may be applied in any one of the information bit level before channel attachment, the information bit level before channel coding, the encoded bit level after channel coding, a bit level after rate matching, a symbol level after modulation (e.g., QPSK), a quadruplet level (or REG level) in units of 4QPSK symbol, or a subcarrier level after CCE interleaving.

Figure 16:
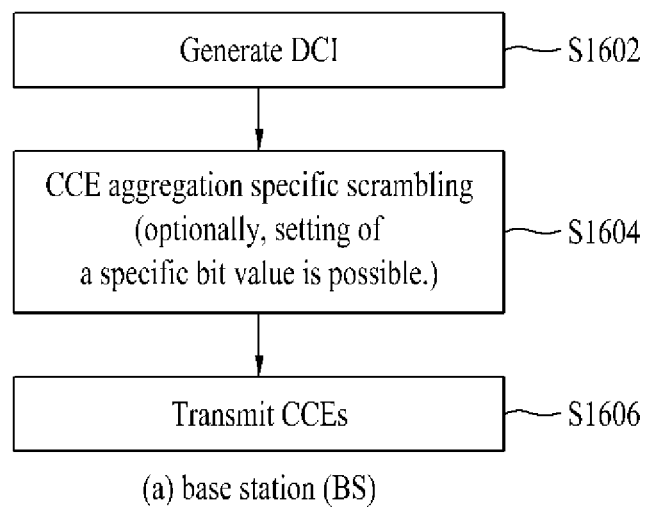
FIG. 16 is a flowchart illustrating a method for processing signals by a base station (BS) and a user equipment (BS) according to another embodiment of the present invention.
Figure 16:
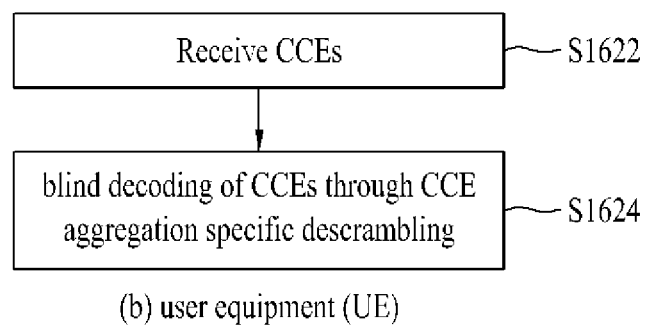

FIG. 16 is a flowchart illustrating a method for processing signals by a base station (BS) and a user equipment (BS) according to another embodiment of the present invention.

Referring to FIG. 16, the base station (BS) generates DCI at step S1602. DCI may be generated according to the method shown in FIG. 4. The base station (BS) maps the DCI to a CCE using a given scramble pattern for each CCE aggregation level at step S1604. Thereafter, the BS transmits CCEs to the UE at step S1606. UE signal processing is performed in reverse order of the BS signal processing. That is, the UE receives CCEs from the BS at step S1622, and performs blind decoding using CCE aggregation specific descrambling at step S1624. Blind decoding may be performed according to the method shown in FIG. 5.

Equation 5 shows an example of CCE aggregation specific scrambling.

$$c(n)=(a(n)+b(n)) \bmod 2$$

$$c(n)=\text{Perm}(a(n),b(n)) \quad \text{[Equation 5]}$$

In Equation 5, c(n) is a scrambled bit sequence, a(n) is an information bit stream, and b(n) is a CCE level specific scramble sequence. 'mod' represents a modulo operation, and 'Perm(a,b)' indicates a function for permuting the value of 'a' using the pattern of 'b'.

For convenience of description, Equation 5 assumes that bit level scrambling is applied upon completion of rate matching. CCE aggregation specific bit level scrambling may be applied before or after cell-specific scrambling. The CCE aggregation specific bit level scrambling are disclosed only for illustrative purposes, and the scope or spirit of the present invention is not limited thereto.

On the other hand, if the number of UE operations depending on CCE detection is a small number (e.g., two UE operations), the UE need not always discriminate CCE aggregation levels of all cases. In this case, it sufficient for an UE to determine whether a CCE aggregation level of a PDCCH is set to 1 or not. For example, if a CCE is transmitted at L=1, scrambling is performed using <0, . . . ,0> (that is, all bits are set to '0'). In association with the remaining L (i.e., L=2, 4, 8), scrambling is performed using <1, . . . ,1> (i.e., all bits are set to '1'). Alternatively, if a CCE is transmitted at L=1, scrambling is performed using <1, . . . ,1> (i.e., all bits are set to '1'). In association with the remaining L values (i.e., L=2, 4, 8), scrambling is performed using <0, . . . ,0> (i.e., all bits are set to '0'). Scrambling using <0, . . . ,0> is equivalent to no operation. Scrambling using <1, . . . ,1> is equivalent to inversion of an original value.

Equation 6 shows an example of CCE mapping according to the present invention.

$$L=1: (b^{(nPDCCH)}(0)+1) \mod 2, (b^{(nPDCCH)}(1)+1) \mod 2, (b^{(nPDCCH)}(71)+1) \mod 2$$

$$L=2: (b^{(nPDCCH)}(0)+0) \mod 2, (b^{(nPDCCH)}(1)+0) \mod 2, (b^{(nPDCCH)}(143)+0) \mod 2$$

$$L=4: (b^{(nPDCCH)}(0)+0) \mod 2, (b^{(nPDCCH)}(1)+0) \mod 2, (b^{(nPDCCH)}(287)+1) \mod 2$$

$$L=8: (b^{(nPDCCH)}(0)+0) \mod 2, (b^{(nPDCCH)}(1)+0) \mod 2, (b^{(nPDCCH)}(575)+0) \mod 2 \quad \text{[Equation 6]}$$

Equivalently to scrambling after rate matching, if $M_{bit}^{(i)}=72$ is given, $b^{(i)}(n)$ is updated to $b^{(i)}(n)=(b^{(i)}(n)+1) \mod 2$, $n=0, \ldots, M_{bit}^{(i)}-1$, and PDCCH mapping is then performed.

If it is necessary to determine whether the CCE aggregation level is set to '1', and if all values of the scrambling sequence are set to '0' or '1', the largest hamming distance between two scramble sequences is achieved, so that the they could be optimum scrambling patterns. If the number of necessary sequences is set to n (e.g., 2 or more), it is preferable that the scrambling patterns of the corresponding number may be configured as being a set of sequences each having a large hamming distance. However, actually, the scrambling sequences may not be composed in view of the hamming distance.

Equivalently to scrambling after rate matching, CCE aggregation specific scrambling may be applied to a QPSK symbol after modulation, and a detailed description thereof will hereinafter be described in detail. For example, if a CCE aggregation level is set to 1 (i.e., M_tot=72, M_symb=36), scrambling is carried out using a complex signal (or a real number) of (−1+j0). This operation may be equivalent to the scrambling. That is, if L=1, d(0)·(−1), . . . ,d(35)·(−1) is performed, such that a false alarm may be removed. d(i) (where i=0, . . . ,M_symb−1) denotes a modulation symbol, and M_symb denotes the size of a modulation symbol. This operation may be equivalent to the resultant value obtained when the scramble sequence value is used to scramble bit vectors, each of the scramble sequence is set to '1'.

If CCE aggregation levels are discriminated through scrambling, there may be a combination capable of being detected by the same UE ID irrespective of a scrambling sequence, in a specific scrambling configuration. In this case, it is impossible to solve ambiguity of a CCE aggregation only using the corresponding scrambling scheme (i.e., information/CRC/UE ID/parity bits to which scrambling is applied). In order to solve the above-mentioned ambiguity, a method dependent upon the DCI format syntax may be used as a supplementary means for solving the ambiguity. For example, if a field or bit(s) including a predictable value exists in a DCI format, although the field or bit(s) is detected using the same UE-ID before or after scrambling, the ambiguity can be solved by checking whether the corresponding field value is correct. For this purpose, a virtual CRC may be utilized. That is, assuming that value(s) of specific bit(s) of a DCI format is preset to a constant value (0 or 1), the corresponding value is changed through scrambling, so that violation occurs at the corresponding position value. Therefore, the UE can determine whether scrambling is applied to its own control information through the corresponding bit position/value.

A procedure for enabling the UE to solve ambiguity of CCE aggregation is as follows. Decoding is performed at a CCE aggregation level=1, 2, 4 or 8. If 'CRC OK' is generated through the UE ID, the UE can recognize that a PDCCH has been transmitted to the UE. In order to determine whether scrambling is applied to decoded control information, the UE detects the location or field of a specific bit. If the corresponding location is set differently from the expected bit value, it is determined that scrambling has been applied. If scrambling is applied, descrambling is performed using the corresponding scrambling sequence. In this case, if there is a plurality of candidate scramble sequences, descrambling is performed using all the scramble sequences until a current value reaches a specific value where a specific field value or a bit position is expected. If the bit position or the field value is identical to the expected value, it is assumed that control information is correctly received. In association with the CCE aggregation level, the CCE aggregation level corresponding to a descrambling sequence is determined to be a CCE aggregation level with which the corresponding control information is transmitted.

Figure 17:
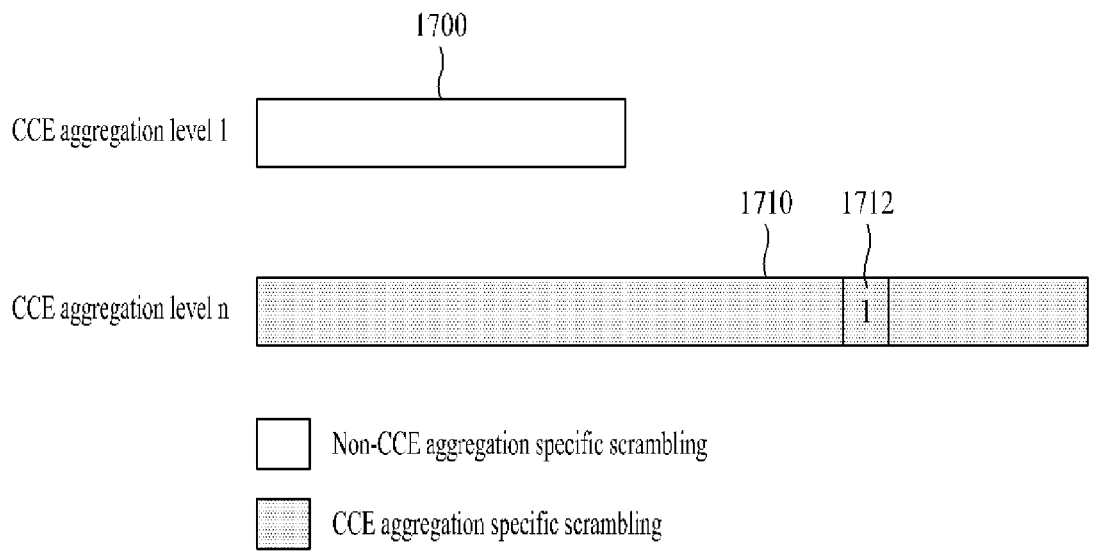
FIG. 17 shows an example of a CCE-aggregation specific scramble according to another embodiment of the present invention.

FIG. 17 shows an example of a CCE-aggregation specific scramble according to another embodiment of the present invention. Referring to FIG. 17, if a CCE aggregation level is set to 1, DCI is mapped to one CCE 1700, and CCE aggregation specific scrambling is not applied to the CCE 1700. In contrast, if the CCE aggregation level is not set to 1, DCI is mapped to multiple CCEs 1710, and CCE specific scrambling is applied to the CCEs 1710. In this case, a bit located at a specific position contained in the DCI format may be set to 1. The bit located at the specific position may be one of bits constructing a virtual CRC.

Embodiment 3

Indication of CCE Aggregation Level

Whereas the above-mentioned embodiments have disclosed a method for handling signals of control information, Embodiment 3 will disclose a method for directly signaling a CCE aggregation level. For convenience of description, the corresponding DCI relates to a UE operating in a SORTD or MIMO mode. In the case of indicating usage/non-usage of two PUCCH resources, two states are needed and thus only one bit is necessary. Assuming that bits representing a virtual CRC exist, either the corresponding bit or one bit from among the bits may be used to indicate a CCE aggregation level. Alternatively, if the remaining bits exist in a CIF field, one of CIF bits may be used to indicate a CCE aggregation level. If the above-mentioned description relates to transmission of UL ACK/NACK corresponding to a PDSCH indicated by a DL grant, one bit may be especially inserted into a DL grant of a PDCCH. Differently from the above-mentioned description, one bit may always be added to DCI irrespective of a DCI format. In this case, the following methods can be used.

For example, if a virtual CRC exists (or if the padded bit exists), the corresponding bit can be used for a CCE aggregation level indicator. In this case, the virtual CRC value is not fixed, and may dynamically indicate a value indicating the CCE aggregation level. If the virtual CRC is not present and the redundant bits are not present, the padding bit may be configured to add one bit. In this case, in order to solve the PUCCH ambiguity of a DCI format, one or more bits may be added. The value of the added padding bit may be dynamically established as a value indicating the CCE aggregation level.

Embodiment 3 uses one bit to indicate whether "CCE aggregation level=1" or not. However, one bit may be implicitly used in association with a fall-back mode. For example, the UE transmission mode depending on the value of a 1-bit indicator can be configured as follows. The value of the 1-bit indicator and its associated transmission mode may also be configured in reverse order of the following.

If the 1-bit indicator is set to 0, a single antenna port mode is determined.

If the 1-bit indicator is set to 1, SORTD is turned on, a first orthogonal resource is determined using the lowest CCE index, and a second orthogonal resource is determined using a predetermined offset (e.g., +1) related to the first orthogonal resource.

In another example, if L is set to 1 (L=1), an offset for SORTD can be differently used according to whether a CCE index is an odd or even number, and a detailed description thereof is as follows.

If an SORTD offset is set to 0, a single antenna port mode is determined.

If an SORTD offset is set to 1, a first orthogonal resource is determined using the lowest CCE index, and the second orthogonal resource is determined using a predetermined offset related to the first orthogonal resource. (If a CCE index is an even number at L=1, a predetermined offset (+1) is used. If a CCE index is an odd number at L=1, a predetermined offset (−1) is used. Alternatively, +1 (or −1) is used as an offset irrespective of whether a CCE index is an odd or even number)

Embodiment 4

Restriction on CCE Aggregation Combination

A search space for searching for a PDCCH has an aligned structure for each aggregation level. For example, if a search space for a CCE aggregation level 1 (L=1) overlaps with a search space for a CCE aggregation level 2 (L=2), an unexpected error may occur in discriminating the CCE aggregation unless a special method for discriminating the CCE aggregation is used.

As can be seen from FIGS. 12 and 13, the CCE confusion problem occurs only when the start position of a CCE candidate is denoted by an even number. Therefore, the position of a CCE candidate (e.g., the start position) may be limited according to a CCE aggregation level, or with this limitation a CCE search space may be modified. In this case, only when the lowest index of CCEs on which the detected control information is present is an odd number (or an even number), a CCE aggregation level (L) is determined as being '1' (CCE aggregation level (L)=1), and it is determined that the remaining cases are two or more CCE aggregation levels. In this case, assuming that the search space of CCE aggregation level (L)=1 is configured in the same manner as in the legacy structure, a size of the search space shown in FIG. 12 can be reduced to 3, or contiguous spaces at the odd (or even) positions may be defined as a search space in order to maintain search space size. For convenience of description and better understanding of the present invention, the former case is referred to as search space limitation, and the latter case is referred to as search space modification.

The search space limitation/modification according to this embodiment can be applied to the following cases.

First, the above-mentioned search space limitation/modification can be applied to the present invention, irrespective of whether the search space (CCE aggregation level (L)=1) overlaps with another search space of L≥2. That is, the search space limitation/modification can always be applied to the search space of L=1. Second, if the search space of L=1 overlaps with another search space of L≥2, the search space limitation/modification can be applied to the entire search space of L=1. Third, if the search space of L=1 overlaps with another search space of L≥2, the search space limitation/modification can be applied only to the overlap part of the search space of L=1. For example, if the search space of L≥2 overlaps with another search space of L=1, only odd (or even) CCE indexes can be used as a search space of L=1 only in the overlap search space.

In addition, the UE-specific search space can be limited only to a UE operating in a specific mode (e.g., SORTD or MIMO mode). For example, in association with a SORTD or 2Tx-configured UE, the search space is limited to an odd CCE index. For example, provided that a CCE index candidate for L=1 of a certain UE is set to 4, 5, 6, 7, 8 and 9, the number of CCE candidates may be limited to 3 CCEs (i.e., odd CCE indexes=5, 7, 9). In order to maintain the number (6) of CCE index candidates at L=1, the CCE index candidates may be configured to be 5, 7, 9, 11, 13, 15. On the other hand, the CCE index candidates for L=1 of the legacy LTE UE may be configured to be 4, 5, 6, 7, 8, and 9.

Figure 18:
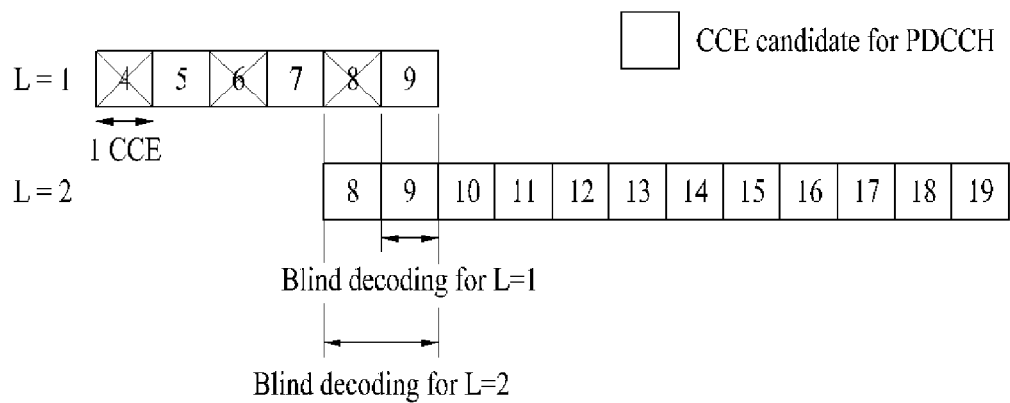
FIGS. 18 to 20 are conceptual diagrams illustrating examples for limiting/modifying a CCE search space for each CCE aggregate.
Figure 19:
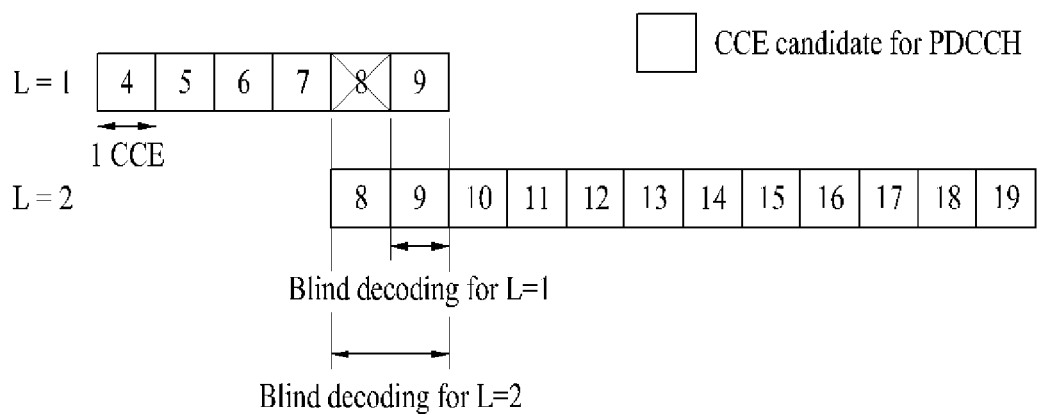
Figure 20:
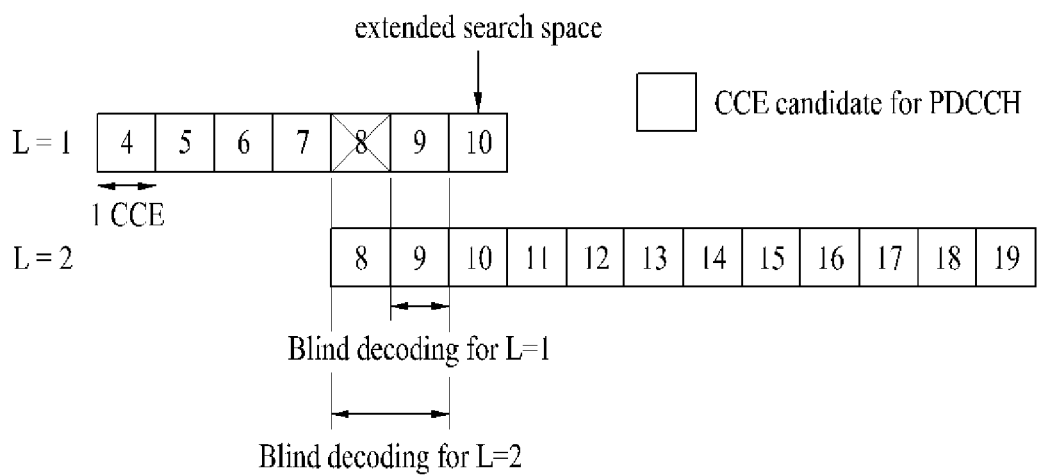

FIGS. 18 to 20 are conceptual diagrams illustrating examples for limiting/modifying a CCE search space for each CCE aggregation level. FIG. 18 exemplarily shows that the search space of L=1 is limited only to even CCE indexes. FIG. 19 exemplarily shows that even CCE indexes are limited only to the search space of L=1 when search spaces of different CCE aggregation levels overlap with each other. FIG. 20 exemplarily shows that additional CCE candidates are configured to supplement the reduced CCE candidates.

Equation 7 shows a hashing function applicable to this embodiment. The hashing function is used to define the UE search space.

$$L \cdot \{(Y_k+m) \bmod \lfloor N_{CCE,k}/L \rfloor\}+i, \text{ where } L=1 \quad \text{[Equation 7]}$$

If $(L \cdot \{(Y_k+0) \bmod \lfloor N_{CCE,k}/L \rfloor\}+0) \bmod 2=0$, $L \cdot \{(Y_k+m) \bmod \lfloor N_{CCE,k}/L \rfloor\}+i$ is given (where m=1, 3, 5 or m=1, 3, 5, 7, 9, 11)

If $(L \cdot \{(Y_k+0) \bmod \lfloor N_{CCE,k}/L \rfloor\}+0) \bmod 2=1$, $L \cdot \{(Y_k+m) \bmod \lfloor N_{CCE,k}/L \rfloor\}+i$ is given (where m=0, 2, 4 or m=0, 2, 4, 6, 8, 10).

Although this embodiment can always be applied irrespective of UE configuration, it should be noted that the present invention can be limited only to a case of DL grant PDCCH decoding, in order to eliminate CCE ambiguity encountered when UL ACK/NACK resources are determined. That is, the method for discriminating a CCE aggregation level according to the present invention can be applied only to the case in which a UE specific DL grant (PDCCH) is decoded.

In the legacy LTE, a maximum number of blind decoding is to 44: the number of common search spaces is 12 (CCE aggregation level 4: 4, CCE aggregation level 8: 2→these are performed two times), the number of blind decoding for DL grant in the UE search space is 16 (=6+6+2+2), and the number of blind decoding for UL grant in the UE search space is 16 (=6+6+2+2).

From among 44 blind decoding attempts, if the CCE aggregation level is set to 1, the search space restriction may be always applied. In this case, a total number of blind decoding attempts is reduced to 38 (i.e., 12(=6+6)+13(=3+

6+2+2)+13 (=3+6+2+2)). From among 44 blind decoding attempts, the search space limitation can be applied to the case of a DL grant and a CCE aggregation level 1. In this case, a total number of blind decoding attempts is reduced to 41 (i.e., 12(=6+6)+13(=3+6+2+2)+(=6+6+2+2)). In contrast, in the case of the search space modification, 44 blind decoding times can be maintained irrespective of whether this embodiment is applied to a DL grant only or all cases.

Embodiment 5

Zero-Padding According to CCE Aggregation Level

Embodiment 5 performs zero-padding at an arbitrary position of a bit stream at an information bit level according to a CCE aggregation level prior to execution of channel coding, such that the CCE ambiguity problem can be eliminated. The zero-padding can be performed according to the CCE aggregation level to be discriminated. For example, if L=1, 0-bit zero padding can be performed. If L=2, 1-bit zero padding can be performed. If L=4, 2-bit zero padding can be performed. If L=8, 3-bit zero padding can be performed. In association with the SORTD resource allocation problem, one case in which the CCE aggregation level is set to 1 can be distinguished from the other case in which the CCE aggregation level is not set to 1. Only in the case of L=1, x-bit zero-padding may be performed. The x-bit zero bit stream can be also used for a virtual CRC capable of increasing reliability by checking the corresponding zero-bit sequence during the decoding. In addition, in order to prevent the information bit size from being excessively increased so as not to increase the channel coding rate, zero-padding of 1 bit may be inserted only at L=1, and the remaining parts may be configured to satisfy the legacy LTE scheme.

The zero padding bit(s) may be located at the foremost part of the information bit sequence. In this case, the CCE aggregation level can be effectively discriminated using a smaller number of zero-padded bit sequence. For example, it is assumed that the DCI information size defined by the legacy LTE is 42 bits. That is, the bit sequence is denoted by <a(0), a(41)>. If 1-bit zero-padding is performed only at L=1, the input value for performing channel coding (e.g., TBCC) may be represented by the following equation 8 according to the CCE aggregation level (L).

$$L=1: <0, a(0), a(1), \ldots, a(41)>$$

$$L=2,4,8: <a(0), a(1), \ldots, a(41)> \quad \text{[Equation 8]}$$

Figure 21:
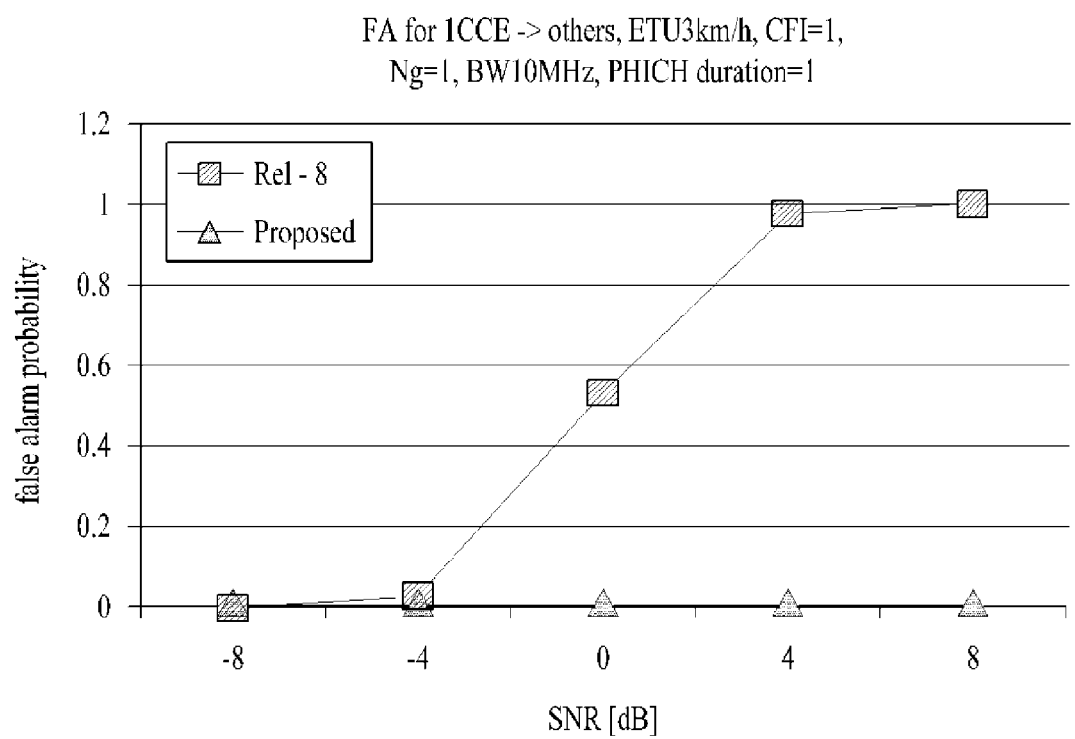
FIGS. 21 and 22 show a CCE-aggregation level detection performance according to embodiments of the present invention.
Figure 22:
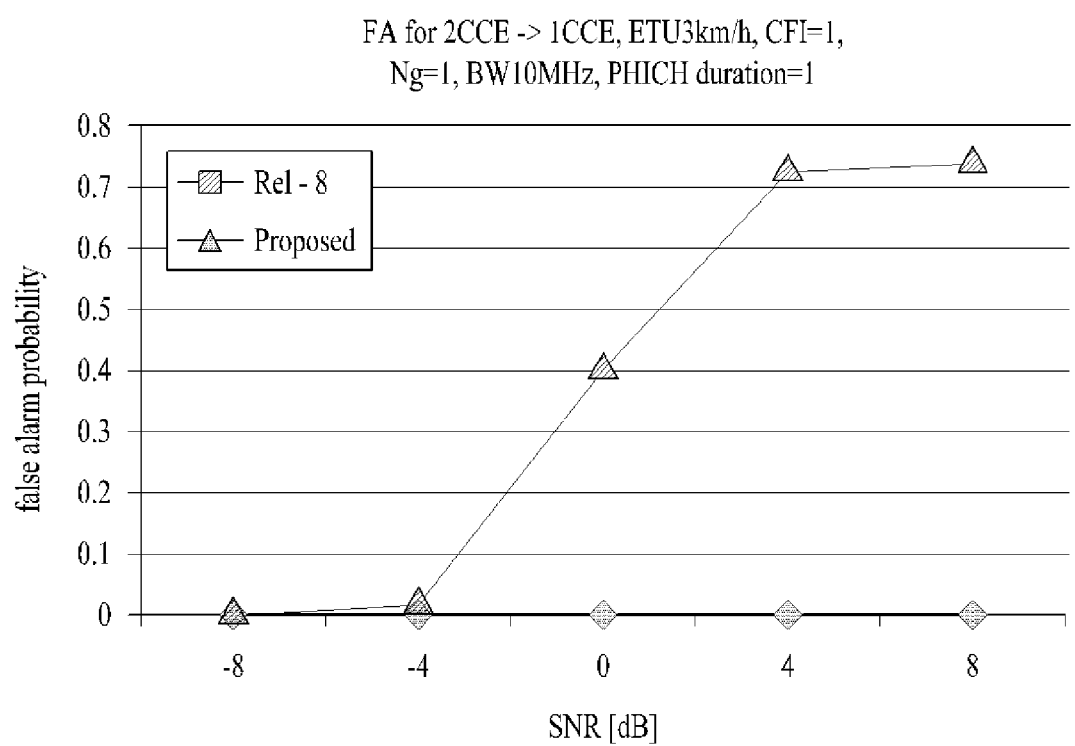

FIG. 21 shows the examination result of the false alarm probability in which a UE wrongly detects other CCE aggregation levels under the condition that the BS transmits a PDCCH at L=1. Whereas the false alarm of 100% has occurred at a high SNR region according to the related art, the present invention can achieve the false alarm of 0% using the methods proposed by the above-mentioned embodiments. FIG. 22 shows the examination result of the false alarm probability in which the UE wrongly detects a PDCCH transmitted at a different CCE aggregation level L=1 under the condition that the BS transmits a PDCCH at L=2. As compared to the false alarm of 75% in a high SNR region according to the related art, the present invention can achieve the false alarm of 0% through the proposed CCE-specific scrambling method.

Figure 23:
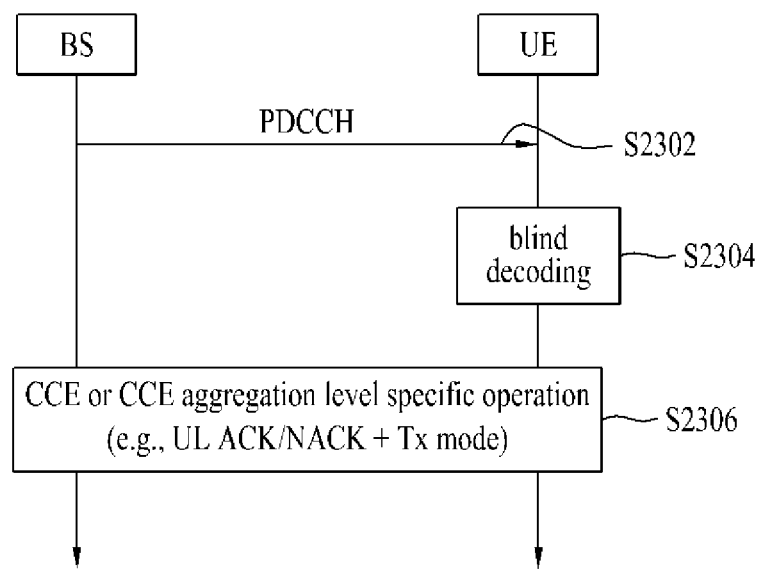
FIG. 23 is a flowchart illustrating a method for detecting a CCE aggregation level and performing associated operations according to embodiments of the present invention.

FIG. 23 is a flowchart illustrating a method for detecting a CCE aggregation level and performing associated operations according to embodiments of the present invention.

Referring to FIG. 23, the BS transmits a PDCCH to the UE at step S2302. The BS generates a PDCCH using methods shown in Embodiments 1 to 5 so as to prevent CCE confusion from occurring. That is, the BS generates a PDCCH using the CCE aggregation specific mapping, the CCE aggregation specific scrambling, the search space limitation/modification, the zero-padding, and the like. The methods of Embodiments 1 to 5 may also be applied only to a PDCCH for DL grant. The UE performs blind decoding for each CCE aggregation so as to search for an indicated PDCCH at step S2304.

If blind decoding has been successfully performed, the UE performs operations related to a CCE index and a CCE aggregation level that are used for PDCCH transmission at step S2306. The case in which the UE decides a transmission mode will hereinafter be described in detail. For convenience of description, a TxD mode (i.e., SORTD mode, or a mode requesting multiple resources) is RRC-configured for a PUCCH transmission mode. If it is assumed that the use of SORTD can be configured for a PUCCH transmission method of a certain UE, and if a CCE aggregation level of a PDCCH is set to 2 or more, a first orthogonal resource index for a first antenna is determined by the lowest CCE index (n_lowest) and a second orthogonal resource index for a second antenna is determined by the next CCE index (n_lowest+1). If the CCE aggregation level is set to 1, a UE transmission mode can be automatically set to a single antenna port mode. In this case, a CCE index used for a single antenna port mode may be n_lowest.

In more detail, a PDCCH relates to a DL grant, and UL ACK/NACK is transmitted to a transmission mode linked to a CCE aggregation level. For example, if a DL grant PDCCH is detected at L=1, UL ACK/NACK corresponding to a PDCCH can be transmitted through a PUCCH resource corresponding to the smallest CCE index in a single antenna port mode. On the other hand, if a DL grant PDCCH is detected at L=2, 4, 8, the UE can transmit UL ACK/NACK corresponding to the PDCCH through a plurality of PUCCH resources in a SORTD mode. In this case, a first orthogonal resource for a first antenna (e.g., a physical antenna, a physical antenna or a layer) may correspond to the smallest CCE index, and a second orthogonal resource for a second antenna may correspond to the next CCE index (i.e., n_lowest+1).

Figure 24:
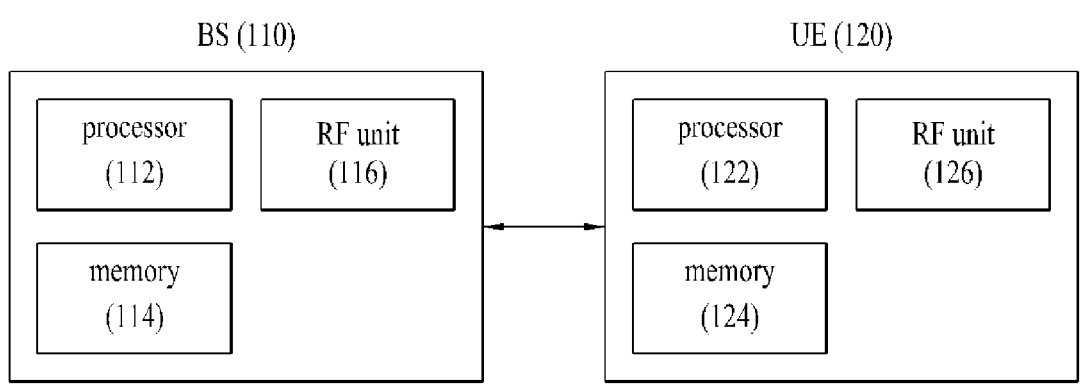
FIG. 24 is a block diagram illustrating a base station (BS) and a user equipment (BS) applicable to embodiments of the present invention.

FIG. 24 is a block diagram illustrating a base station (BS) and a user equipment (BS) applicable to embodiments of the present invention.

Referring to FIG. 25, the wireless communication system includes a base station (BS) 110 and a UE 120. The BS 110 includes a processor 112, a memory 114, and a radio frequency (RF) unit 116. The processor 112 may be constructed to implement the procedures and/or methods disclosed in the embodiments of the present invention. The memory 114 may be connected to a processor 112, and store various information related to operations of the processor 112. The RF unit 116 is connected to the processor 112, and transmits and/or receives RF signals. The UE 120 includes a processor 122, a memory 124, and an RF unit 126. The processor 122 may be constructed to implement the procedures and/or methods disclosed in the embodiments of the present invention. The memory 124 may be connected to a processor 122, and store various information related to operations of the processor 122. The RF unit 126 is connected to the processor 122, and transmits and/or receives RF signals. The BS 110 and/or the UE 120 may include a single antenna or multiple antennas.

The aforementioned embodiments are achieved by combination of structural elements and features of the present invention in a predetermined fashion. Each of the structural elements or features should be considered selectively unless specified otherwise. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

The embodiments of the present invention have been described based on data transmission and reception between a BS (or eNB) and a UE. A specific operation which has been described as being performed by the eNB (or BS) may be performed by an upper node of the eNB (or BS) as the case may be. In other words, it will be apparent that various operations performed for communication with the UE in the network which includes a plurality of network nodes along with the eNB (or BS) can be performed by the BS or network nodes other than the eNB (or BS). The eNB (or BS) may be replaced with terms such as fixed station, Node B, eNode B (eNB), and access point. Also, the term UE may be replaced with terms such as mobile station (MS) and mobile subscriber station (MSS).

The embodiments according to the present invention can be implemented by various means, for example, hardware, firmware, software, or combinations thereof. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a module, a procedure, or a function, which performs functions or operations as described above. Software code may be stored in a memory unit and then may be driven by a processor. The memory unit may be located inside or outside the processor to transmit and receive data to and from the processor through various well known means.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Exemplary embodiments of the present invention can be applied to a user equipment (UE), a base station (BS), and other devices.

The invention claimed is:

1. A method for receiving a physical downlink control channel (PDCCH) signal at a user equipment (UE) in a wireless communication system, the method comprising:
   Receiving, by the UE, a subframe including a plurality of search spaces in a carrier, wherein each search space is for a respective one of a number of control channel element (CCE) aggregation levels;
   Monitoring, by the UE, PDCCH candidates in a search space of a respective CCE aggregation level to receive the PDCCH signal; and
   Performing, by the UE, a procedure for receiving or transmitting a physical shared channel signal based on successful reception of the PDCCH signal,
   wherein a CCE position of the search space of the respective CCE aggregation level in the carrier is calculated based on a value of a carrier indicator field (CIF).

2. The method of claim 1, wherein the monitoring the PDCCH candidates includes decoding the PDCCH candidates.

3. The method of claim 1, wherein the PDCCH signal indicates a physical downlink shared channel (PDSCH) signal, and
   if a CCE aggregation level of the PDCCH signal is 1, a single physical uplink control channel (PUCCH) resource is allocated based on a lowest CCE index of the PDCCH signal, and
   if the CCE aggregation level of the PDCCH signal is 2 or higher, a plurality of PUCCH resources is allocated based on the lowest CCE index of the PDCCH signal.

4. The method of claim 3, wherein the plurality of PUCCH resources is orthogonal to each other.

5. The method of claim 4, wherein a first one of the plurality of PUCCH resources is determined based on the lowest CCE index of the PDCCH signal, and a second one of the plurality of PUCCH resources is determined based on a sum of an offset and the lowest CCE index of the PDCCH signal.

6. A user equipment (UE) for receiving a physical downlink control channel (PDCCH) signal in a wireless communication system, the UE comprising:
   a radio frequency (RF) unit; and
   a processor,
   wherein the processor is configured to:
      receive a subframe including a plurality of search spaces in a carrier, wherein each search space is for a respective one of a number of control channel element (CCE) aggregation levels,
      monitor PDCCH candidates in a search space of a respective CCE aggregation level to receive the PDCCH signal, and
      perform a procedure for receiving or transmitting a physical shared channel signal based on successful reception of the PDCCH signal,
   wherein a CCE position of the search space of the respective CCE aggregation level in the carrier is calculated based on a value of a carrier indicator field (CIF).

7. The UE of claim 6, wherein the monitoring the PDCCH candidates includes decoding the PDCCH candidates.

8. The UE of claim 6, wherein the PDCCH signal indicates a physical downlink shared channel (PDSCH) signal, and if a CCE aggregation level of the PDCCH signal is 1, a single physical uplink control channel (PUCCH) resource is allocated based on a lowest CCE index of the PDCCH signal, and if the CCE aggregation level of the PDCCH signal is 2 or higher, a plurality of PUCCH resources is allocated based on the lowest CCE index of the PDCCH signal.

9. The UE of claim 8, wherein the plurality of PUCCH resources is orthogonal to each other.

10. The UE of claim 8, wherein a first one of the plurality of PUCCH resources is determined based on the lowest CCE index of the PDCCH signal, and a second one of the plurality of PUCCH resources is determined based on a sum of an offset and the lowest CCE index of the PDCCH signal.

* * * * *